US008993922B2

(12) United States Patent
Atsumi et al.

(10) Patent No.: US 8,993,922 B2
(45) Date of Patent: *Mar. 31, 2015

(54) LASER PROCESSING METHOD AND DEVICE

(75) Inventors: Kazuhiro Atsumi, Hamamatsu (JP);
Koji Kuno, Hamamatsu (JP);
Masayoshi Kusunoki, Hamamatsu (JP);
Tatsuya Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1182 days.

This patent is subject to a terminal disclaimer.

(21) Appl. No.: 10/585,451

(22) PCT Filed: Dec. 13, 2004

(86) PCT No.: PCT/JP2004/018591
§ 371 (c)(1),
(2), (4) Date: May 4, 2007

(87) PCT Pub. No.: WO2005/065880
PCT Pub. Date: Jul. 21, 2005

(65) Prior Publication Data
US 2008/0037003 A1    Feb. 14, 2008

(30) Foreign Application Priority Data

Jan. 9, 2004   (JP) ............... P2004-004312

(51) Int. Cl.
*B23K 26/14*  (2014.01)
*B23K 26/00*  (2014.01)
(Continued)

(52) U.S. Cl.
CPC ........... *B23K 26/0057* (2013.01); *B23K 26/046* (2013.01); *B23K 26/4075* (2013.01); *B23K 26/048* (2013.01)
USPC ................................... 219/121.67

(58) Field of Classification Search
USPC ............ 219/121.67, 121.68, 121.69, 121.83, 219/121.62, 121.75, 121.7, 121.73, 121.74, 219/121.76; 372/29.014; 356/601–640
See application file for complete search history.

(56) References Cited

U.S. PATENT DOCUMENTS 3,629,545 A   12/1971   Graham et al.
4,546,231 A   10/1985   Gresser et al.
(Continued)

FOREIGN PATENT DOCUMENTS

CN   1160228 A       9/1997
EP   1 338 371 A1    8/2003
(Continued)

OTHER PUBLICATIONS

K. Hayashi, "Inner Glass Marking by Harmonics of Solid-state Laser," Proceedings of 45th Laser Materials Processing Conference, Dec. 1998, pp. 23-28, with English abstract.
(Continued)

*Primary Examiner* — Tu B Hoang
*Assistant Examiner* — Joseph Iskra
(74) *Attorney, Agent, or Firm* — Drinker Biddle & Reath LLP

(57) ABSTRACT

A laser processing method which can efficiently perform laser processing while minimizing the deviation of the converging point of a laser beam is provided.
This laser processing method comprises a displacement acquiring step (S07 to S11) of irradiating an object to be processed with a rangefinding laser beam for measuring a displacement of a main surface of the object while converging the laser beam with a lens and acquiring the displacement of the main surface along a line to cut while detecting reflected light reflected by the main surface in response to the irradiation; and moves the processing objective lens and the object relative to each other along the main surface, while adjusting the gap between the processing objective lens and the surface according to the displacement acquired by the displacement acquiring step, thereby forming the modified region along the line to cut.

24 Claims, 10 Drawing Sheets

(51) Int. Cl.
B23K 26/04 (2014.01)
B23K 26/40 (2014.01)

(56) References Cited

U.S. PATENT DOCUMENTS

| | | | |
|---|---|---|---|
| 4,562,333 A | 12/1985 | Taub et al. | |
| 4,769,523 A | 9/1988 | Tanimoto et al. | |
| 4,944,922 A | 7/1990 | Hayashi | |
| 5,017,796 A | 5/1991 | Makita | |
| 5,038,016 A * | 8/1991 | Robertson et al. | 219/121.83 |
| 5,122,648 A | 6/1992 | Cohen et al. | |
| 5,254,833 A | 10/1993 | Okiyama | |
| 5,392,110 A * | 2/1995 | Yojima et al. | 356/3.04 |
| 5,463,202 A * | 10/1995 | Kurosawa et al. | 219/121.83 |
| 5,543,365 A | 8/1996 | Wills et al. | |
| 5,594,235 A | 1/1997 | Lee | |
| 5,622,540 A | 4/1997 | Stevens | |
| 5,637,244 A | 6/1997 | Erokhin | |
| 5,698,120 A * | 12/1997 | Kurosawa et al. | 219/121.62 |
| 5,776,220 A | 7/1998 | Allaire et al. | |
| 5,826,772 A | 10/1998 | Ariglio et al. | |
| 5,883,356 A | 3/1999 | Bauer et al. | |
| 5,990,944 A | 11/1999 | Abe | |
| 6,055,829 A | 5/2000 | Witzmann et al. | |
| 6,175,096 B1 | 1/2001 | Nielsen | |
| 6,211,488 B1 | 4/2001 | Hoekstra et al. | |
| 6,252,197 B1 | 6/2001 | Hoekstra et al. | |
| 6,257,224 B1 | 7/2001 | Yoshino et al. | |
| 6,259,058 B1 | 7/2001 | Hoekstra | |
| 6,322,958 B1 | 11/2001 | Hayashi | |
| 6,353,216 B1 | 3/2002 | Oren et al. | |
| 6,407,360 B1 * | 6/2002 | Choo et al. | 219/121.67 |
| 6,411,838 B1 | 6/2002 | Nordstrom et al. | |
| 6,420,678 B1 | 7/2002 | Hoekstra | |
| 6,489,588 B1 | 12/2002 | Hoekstra et al. | |
| 6,580,054 B1 | 6/2003 | Liu et al. | |
| 6,992,026 B2 | 1/2006 | Fukuyo et al. | |
| 7,396,742 B2 | 7/2008 | Fukuyo et al. | |
| 7,489,454 B2 | 2/2009 | Fukuyo et al. | |
| 7,547,613 B2 | 6/2009 | Fukuyo et al. | |
| 7,566,635 B2 | 7/2009 | Fujii et al. | |
| 7,592,237 B2 | 9/2009 | Sakamoto et al. | |
| 7,592,238 B2 | 9/2009 | Fukuyo et al. | |
| 7,595,895 B2 | 9/2009 | Kurita et al. | |
| 7,605,344 B2 | 10/2009 | Fukumitsu | |
| 7,608,214 B2 | 10/2009 | Kuno et al. | |
| 7,615,721 B2 | 11/2009 | Fukuyo et al. | |
| 7,626,137 B2 | 12/2009 | Fukuyo et al. | |
| 7,709,767 B2 | 5/2010 | Sakamoto | |
| 7,718,510 B2 | 5/2010 | Sakamoto et al. | |
| 7,719,017 B2 | 5/2010 | Tanaka | |
| 7,732,730 B2 | 6/2010 | Fukuyo et al. | |
| 7,749,867 B2 | 7/2010 | Fukuyo et al. | |
| 7,754,583 B2 | 7/2010 | Sakamoto | |
| 7,825,350 B2 | 11/2010 | Fukuyo et al. | |
| 7,897,487 B2 | 3/2011 | Sugiura et al. | |
| 7,902,636 B2 | 3/2011 | Sugiura et al. | |
| 7,939,430 B2 | 5/2011 | Sakamoto et al. | |
| 7,947,574 B2 | 5/2011 | Sakamoto et al. | |
| 2002/0006765 A1 | 1/2002 | Michel et al. | |
| 2002/0050489 A1 | 5/2002 | Ikegami et al. | |
| 2002/0125232 A1 * | 9/2002 | Choo et al. | 219/121.69 |
| 2002/0140949 A1 * | 10/2002 | Sasaki et al. | 356/606 |
| 2002/0153500 A1 | 10/2002 | Fordahl et al. | |
| 2002/0170896 A1 | 11/2002 | Choo et al. | |
| 2003/0024909 A1 | 2/2003 | Hoekstra et al. | |
| 2003/0209528 A1 | 11/2003 | Choo et al. | |
| 2004/0002199 A1 * | 1/2004 | Fukuyo et al. | 438/460 |
| 2004/0206882 A1 | 10/2004 | Banks et al. | |
| 2005/0202596 A1 | 9/2005 | Fukuyo et al. | |
| 2005/0272223 A1 | 12/2005 | Fujii et al. | |
| 2006/0144828 A1 | 7/2006 | Fukumitsu et al. | |
| 2006/0148212 A1 | 7/2006 | Fukuyo et al. | |
| 2006/0255024 A1 | 11/2006 | Fukuyo et al. | |
| 2007/0085099 A1 | 4/2007 | Fukumitsu et al. | |
| 2007/0125757 A1 | 6/2007 | Fukuyo et al. | |
| 2007/0158314 A1 | 7/2007 | Fukumitsu et al. | |
| 2007/0252154 A1 | 11/2007 | Uchiyama et al. | |
| 2008/0035611 A1 | 2/2008 | Kuno et al. | |
| 2008/0037003 A1 | 2/2008 | Atsumi et al. | |
| 2008/0090382 A1 | 4/2008 | Fujii et al. | |
| 2008/0218735 A1 | 9/2008 | Atsumi et al. | |
| 2008/0251506 A1 | 10/2008 | Atsumi et al. | |
| 2009/0008373 A1 | 1/2009 | Muramatsu et al. | |
| 2009/0032509 A1 | 2/2009 | Kuno et al. | |
| 2009/0098713 A1 | 4/2009 | Sakamoto | |
| 2009/0107967 A1 | 4/2009 | Sakamoto et al. | |
| 2009/0117712 A1 | 5/2009 | Sakamoto et al. | |
| 2009/0166342 A1 | 7/2009 | Kuno et al. | |
| 2009/0166808 A1 | 7/2009 | Sakamoto et al. | |
| 2009/0250446 A1 | 10/2009 | Sakamoto | |
| 2009/0261083 A1 | 10/2009 | Osajima et al. | |
| 2009/0302428 A1 | 12/2009 | Sakamoto et al. | |
| 2010/0006548 A1 | 1/2010 | Atsumi et al. | |
| 2010/0009547 A1 | 1/2010 | Sakamoto | |
| 2010/0012632 A1 | 1/2010 | Sakamoto | |
| 2010/0012633 A1 | 1/2010 | Atsumi et al. | |
| 2010/0015783 A1 | 1/2010 | Fukuyo et al. | |
| 2010/0025386 A1 | 2/2010 | Kuno et al. | |
| 2010/0032418 A1 | 2/2010 | Kuno et al. | |
| 2010/0055876 A1 | 3/2010 | Fukuyo et al. | |
| 2010/0151202 A1 | 6/2010 | Fukumitsu | |
| 2010/0176100 A1 | 7/2010 | Fukuyo et al. | |
| 2010/0184271 A1 | 7/2010 | Sugiura et al. | |
| 2010/0200550 A1 | 8/2010 | Kumagai | |
| 2010/0203678 A1 | 8/2010 | Fukumitsu et al. | |
| 2010/0203707 A1 | 8/2010 | Fujii et al. | |
| 2010/0227453 A1 | 9/2010 | Sakamoto | |
| 2010/0240159 A1 | 9/2010 | Kumagai et al. | |
| 2010/0258539 A1 | 10/2010 | Sakamoto | |
| 2010/0301521 A1 | 12/2010 | Uchiyama | |
| 2010/0311313 A1 | 12/2010 | Uchiyama | |
| 2010/0327416 A1 | 12/2010 | Fukumitsu | |
| 2011/0000897 A1 | 1/2011 | Nakano et al. | |
| 2011/0001220 A1 | 1/2011 | Sugiura et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0274128 A1 | 11/2011 | Fukumitsu et al. | |

FOREIGN PATENT DOCUMENTS

| | | |
|---|---|---|
| EP | 1 707 298 | 10/2006 |
| EP | 1 716 960 | 11/2006 |
| JP | 46-24989 | 7/1971 |
| JP | 04-111800 | 4/1992 |
| JP | 04-244910 | 9/1992 |
| JP | 06190578 | 7/1994 |
| JP | 06-252260 | 9/1994 |
| JP | 06-252485 | 9/1994 |
| JP | 07-040336 | 2/1995 |
| JP | 7-236985 | 9/1995 |
| JP | 08-14968 | 1/1996 |
| JP | 09-260310 | 10/1997 |
| JP | 10-163780 | 6/1998 |
| JP | 10-202381 | 8/1998 |
| JP | 11-138896 | 5/1999 |
| JP | 11-163403 | 6/1999 |
| JP | 11-177137 | 7/1999 |
| JP | 11-221684 | 8/1999 |
| JP | 11-267861 | 10/1999 |
| JP | 11-345785 | 12/1999 |
| JP | 2000-009991 | 1/2000 |
| JP | 2000-015467 | 1/2000 |
| JP | 2000-219528 | 8/2000 |
| JP | 2000306865 | 11/2000 |
| JP | 2001-093864 | 4/2001 |
| JP | 2001340979 | * 12/2001 |
| JP | 2002-107120 | 4/2002 |
| JP | 2002-205181 | 7/2002 |
| JP | 2002-219591 | 8/2002 |
| JP | 2002-321080 | 11/2002 |
| JP | 2003-001457 | 1/2003 |

(56) References Cited

FOREIGN PATENT DOCUMENTS

| JP | 2003-002677 | | 1/2003 |
|---|---|---|---|
| JP | 2003251476 | * | 9/2003 |
| JP | 2004-188422 | | 7/2004 |
| JP | 2004-337902 | | 12/2004 |
| JP | 2004-337903 | | 12/2004 |
| WO | 02/22301 | | 3/2002 |
| WO | WO 2004/052586 A1 | | 6/2004 |
| WO | WO2004052586 | * | 6/2004 |

OTHER PUBLICATIONS

T. Sano et al., "Evaluation of Processing Characteristics of Silicon With Picosecond Pulse Laser," Preprints of the National Meeting of Japan Welding Society, No. 66, Apr. 2000, pp. 72-73, with English translation.

K. Miura et al., "Formation of Photo-induced Structures in Glasses with Femtosecond Laser," Proceedings of 42nd Laser Materials Processing Conference, Nov. 1997, pp. 105-111, with English abstract.

T. Miyazaki, "Laser Beam Machining Technology," published by Sangyo-Tosho Inc. on May 31, 1991, First Edition, pp. 9-10, with English translation.

T. Yajima et al., *New Version Laser Handbook*, published by Asakura Shoten, Jun. 15, 1989, pp. 666-669, with English translation.

*Tooling Machine Series, Laser Machining*, published by Taiga Shuppan, Inc., Sep. 10, 1990, pp. 91-96, with English translation.

*Electronic Material*, No. 9, on 2002, published by Kogyo Chousakai, pp. 17-21, with English translation.

F. Fukuyo et al., "Stealth Dicing Technology for Ultra Thin Wafer", presented at 2003 ICEP (International Conference on Electronics Packaging), Apr. 16-18, 2003, Tokyo, Japan.

Office Action from related (not counterpart) U.S. Appl. No. 10/585,660 dated Apr. 14, 2011 (59 pages).

Office Action from related (not counterpart) U.S. Appl. No. 10/585,343 dated Aug. 17, 2011 (19 pages).

U.S. Appl. No. 13/206,181, filed Aug. 9, 2011.
U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.

X. Liu et al., "Laser Ablation and Micromachining with Ultrashort Laser Pulses," IEEE Journal of Quantum Electronics, vol. 33, No. 10, Oct. 1997, pp. 1706-1716.

* cited by examiner

Fig.4
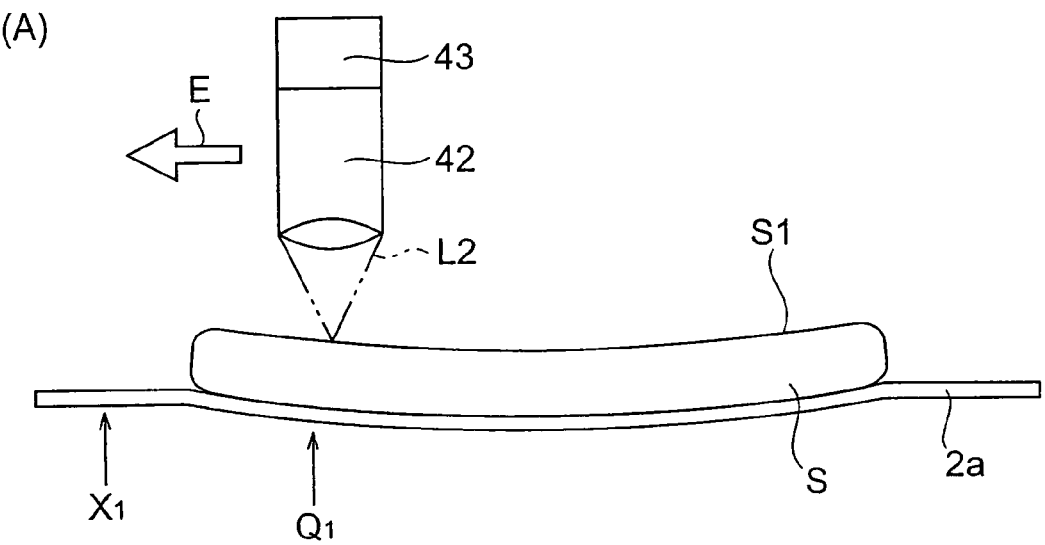
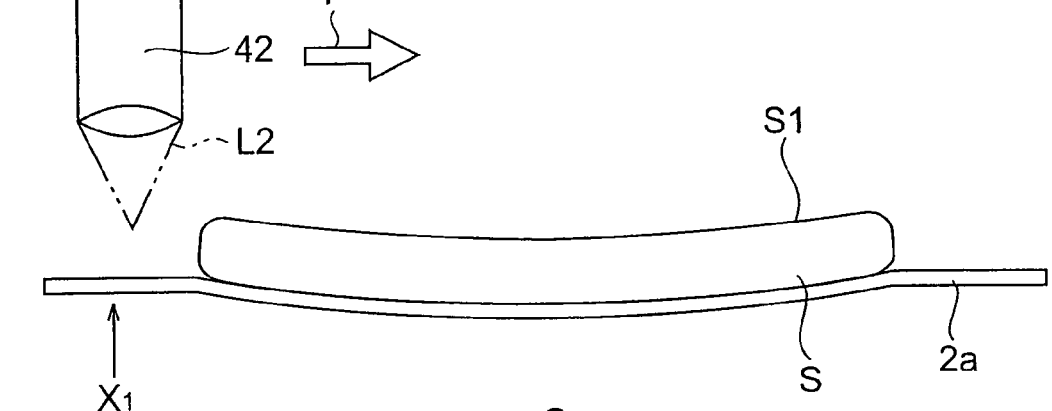
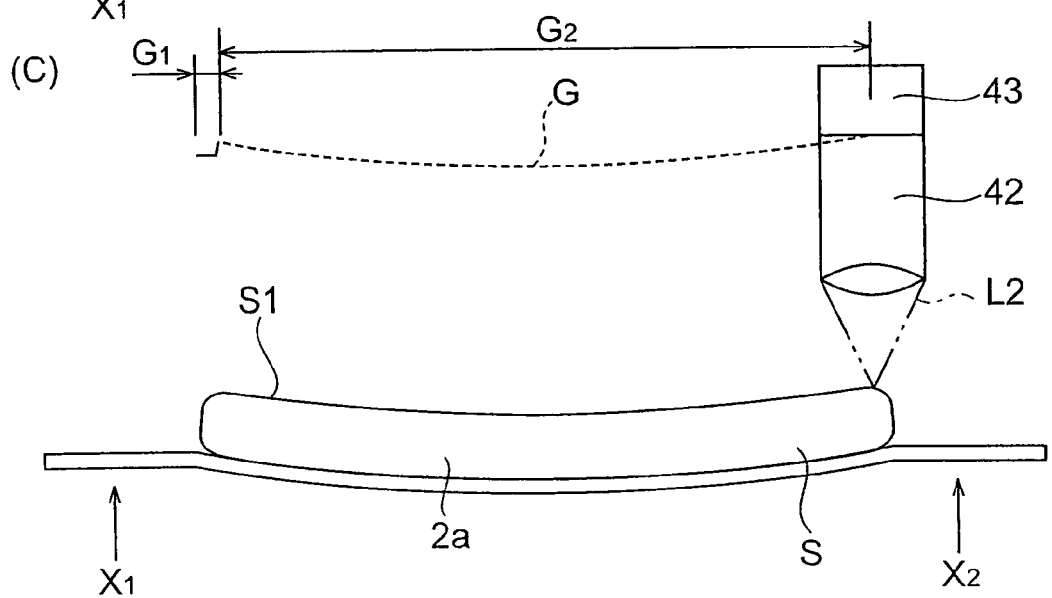

Fig.8
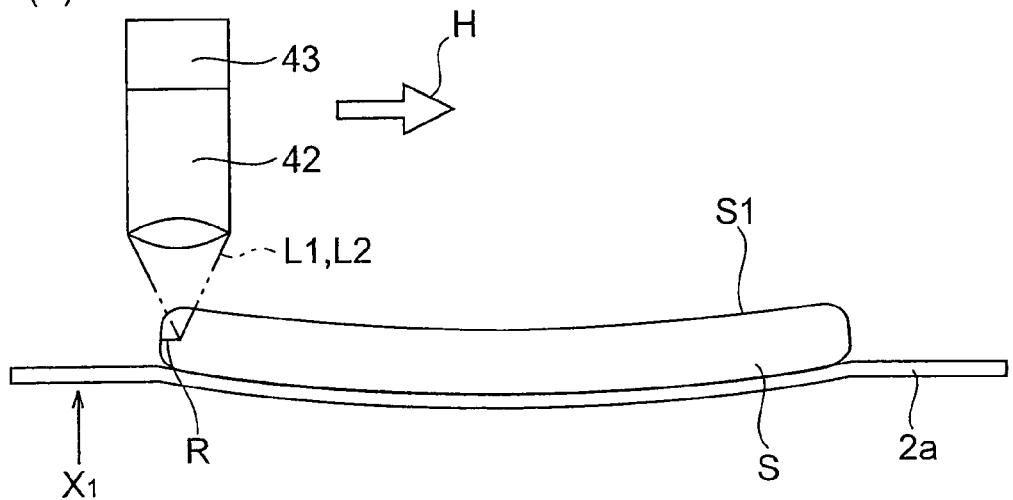
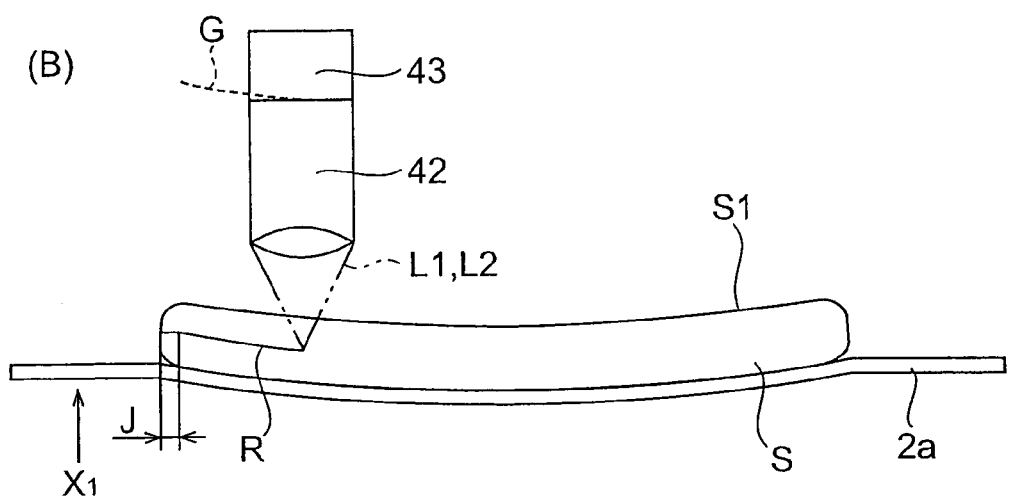
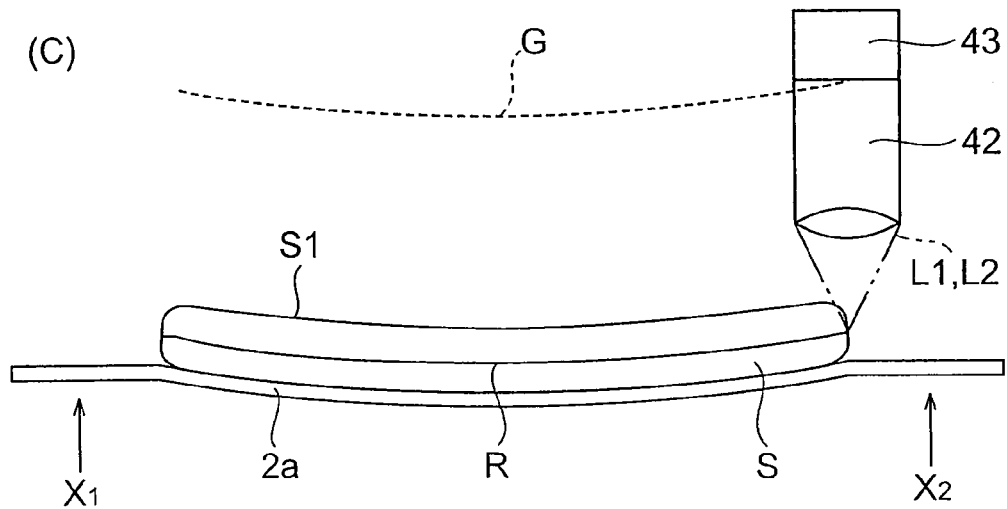

LASER PROCESSING METHOD AND DEVICE

TECHNICAL FIELD

The present invention relates to a laser processing method and laser processing apparatus for processing an object to be processed by irradiating the object with a laser beam.

BACKGROUND ART

Known as a conventional laser processing technique is one in which measurement means (a contact-type displacement meter, an ultrasonic rangefinder, or the like) for measuring the main surface height of the object to be processed is arranged in parallel with a condenser lens for converging a laser beam with a predetermined gap therebetween (see, for example, FIGS. 6 to 10 of Patent Document 1). In such a laser processing technique, while scanning the object with the laser beam along its main surface, the main surface height of the object is measured by the measurement means, and the condenser lens is driven along its optical axis such that the distance between the condenser lens and the main surface of the object becomes constant according to thus measured main surface at the time when the measurement point is positioned directly under the condenser lens.

Known as a technique for processing an object to be processed whose main surface has irregularities, on the other hand, is one in which the planarity in the whole part to be processed is measured by planarity measuring means (a planarity meter comprising a projector and a reflected light receiver) as a preparation for processing and then, with a blade replacing the planarity measuring means, the object is processed according to thus measured planarity (see, for example, Patent Document 2).

Patent Document 1: Japanese Patent Application Laid-Open No. 2002-219591

Patent Document 2: Japanese Patent Application Laid-Open No. HEI 11-345785

DISCLOSURE OF THE INVENTION

Problem to be Solved by the Invention

However, the following problem to be overcome exists in the above-mentioned laser processing apparatus disclosed in Patent Document 1. When the laser beam irradiation is started from a position on the outside of the object to be processed, so as to perform processing while the laser beam and the object are moved along the main surface of the latter, the measurement means proceeds with measurement from the outside of the object to the inside thereof. When the condenser lens is driven according to the measured value of main surface height obtained by this measurement, the converging point of the laser beam may deviate from its predetermined position in end parts of the object to be processed.

Though the planarity of the main surface of the object to be processed can accurately be grasped when the technique disclosed in Patent Document 2 is used, respective means used for measuring and processing must be exchanged, which takes time and labor and may generate a deviation due to the exchange.

Therefore, it is an object of the present invention to provide a laser processing method and laser processing apparatus which can efficiently perform laser processing while minimizing the deviation of the laser beam converging point.

Means for Solving Problem

The present invention provides a laser processing method for irradiating an object to be processed with a first laser beam while converging the first laser beam with a lens such that a converging point is positioned within the object, and forming a modified region within the object along a line to cut in the object; the method comprising (1) a displacement acquiring step of irradiating the object with a second laser beam for measuring a displacement of a main surface of the object while converging the second laser beam with the lens, and acquiring the displacement of the main surface along the line to cut while detecting reflected light reflected by the main surface in response to the irradiation; and (2) a processing step of emitting the first laser beam and moving the lens and the object relative to each other along the main surface while adjusting a gap between the lens and the main surface according to the acquired displacement, so as to form the modified region along the line to cut.

Since the laser processing method of the present invention acquires a displacement of the main surface along the line to cut, and forms a modified region while adjusting the gap between the lens and the main surface according to thus acquired displacement, it can form the modified region at a predetermined position within the object. Since the lens converging the first laser beam for processing also converges the second laser beam for measurement, the displacement of the main surface can be acquired more accurately.

It will be preferred in the laser processing method of the present invention if the displacement of the main surface along the line to cut is acquired at a first time interval while moving the lens and the object relative to each other at a first speed along the main surface in the displacement acquiring step; and the modified region is formed while moving the lens and the object relative to each other at a second speed faster than the first speed along the main surface and adjusting the gap between the lens and the main surface at a second time interval shorter than the first time interval in the processing step. Since the displacement of the main surface is acquired at the first speed slower than the second speed for forming the modified region, the displacement of the main surface can accurately be acquired even when there is a large difference in level of the main surface, for example. Since the modified region is formed at the second speed faster than the first speed for acquiring the displacement of the main surface, the processing efficiency improves. When the first speed, second speed, first time interval, and second time interval are set such that the distance interval along the line to cut for acquiring the displacement of the main surface equals the distance interval along the line to cut for adjusting the gap between the lens and the main surface at the time of forming the modified region, for example, the gap between the lens and the main surface can be adjusted more faithfully according to the acquired displacement of the main surface.

It will also be preferred in the laser processing method of the present invention if the displacement acquiring step comprises a measurement preparatory step of holding the lens at a measurement initial position set such that a converging point of the second laser beam is located at a predetermined position with respect to the object; a first measurement step of starting emitting the second laser beam while holding the lens at the measurement initial position, moving the lens and the object relative to each other along the main surface, and releasing the lens from being held at the measurement initial position in response to reflected light of the second laser beam reflected by the main surface; and a second measurement step of adjusting the gap between the lens and the main surface after the release while detecting the reflected light of the second laser beam reflected by the main surface, so as to acquire the displacement of the main surface along the line to cut. After one end part of the line to cut is irradiated with the second laser beam while the lens is held at the measurement initial position, i.e., after the lens overhangs the object as the lens and the object move relative to each other, the lens is released from being held, and the displacement of the main surface is acquired, whereby the displacement can be acquired while excluding the influence of fluctuations in the shape of end parts in the object as much as possible. Since the quantity of reflected light varies depending on the distance from the reflecting surface, the lens can be released from being held assuming that a part where the quantity of the reflected light undergoes a predetermined change corresponds to an outer edge of the main surface of the object, for example.

It will also be preferred if the processing step comprises a processing preparatory step of setting a processing initial position for holding the lens with respect to the main surface according to the displacement of the main surface along the line to cut acquired by the displacement acquiring step, and holding the lens at thus set processing initial position; a first processing step of starting emitting the first laser beam while holding the lens at the processing initial position, and moving the lens and the object relative to each other so as to form the modified region in one end part of the line to cut; and a second processing step of releasing the lens from being held at the processing initial position after forming the modified region in the one end part of the line to cut, and moving the lens and the object relative to each other after the release while adjusting the gap between the lens and the main surface according to the displacement of the main surface along the line to cut acquired in the displacement acquiring step, so as to form the modified region. The modified region is formed in one end part of the line to cut while holding the lens at the processing initial position, and then is formed while the lens is released from being held and caused to follow the displacement of the main surface. Therefore, the modified region can be formed while excluding the influence of fluctuations in the shape of end parts in the object as much as possible.

It will also be preferred in the laser processing method of the present invention if, in the displacement acquiring step, the first laser beam is emitted when acquiring the displacement of the main surface along the line to cut, so as to form the modified region along the line to cut. This forms the modified region while acquiring the displacement of the main surface at the same time, whereby a single scan can perform the measurement and processing.

It will also be preferred in the laser processing method of the present invention if the modified region formed in the displacement acquiring step is formed between the modified region formed in the processing step and the main surface. The modified region formed in the processing step is positioned farther from the laser light irradiation side than is the modified region formed in the displacement acquiring step, whereby the modified region can be formed widely in the laser beam emitting direction.

It will also be preferred in the laser processing method of the present invention if the line to cut includes first and second lines to cut; the displacement acquiring step moves the lens relative to the object in a first direction extending along the first line to cut, so as to acquire the displacement of the main surface along the first line to cut, and then moves the lens relative to the object in a second direction opposite from the first direction, so as to acquire the displacement of the main surface along the second line to cut; and the processing step forms the modified region along the first line to cut in the first direction, and then forms the modified region along the second line to cut in the second direction. Since the lens acquires the displacement along the first line to cut while moving in the first direction, and acquires the displacement along the second line to cut while moving in the second direction opposite from the first direction, displacements can be acquired as the lens moves back and forth with respect to the object. Since the respective modified regions are formed along the first and second lines to cut as the lens moves back and forth with respect to the object, modified regions can be formed more efficiently.

The present invention provides a laser processing apparatus for irradiating an object to be processed with a first laser beam while converging the first laser beam with a lens such that a converging point is positioned within the object, and forming a modified region within the object along a line to cut in the object; the apparatus comprising a lens for converging the first laser beam and a second laser beam for measuring a displacement of a main surface of the object onto the object; displacement acquiring means for acquiring the displacement of the main surface of the object by detecting reflected light reflected by the main surface in response to irradiation with the second laser beam; moving means for moving the object and the lens relative to each other along the main surface of the object; holding means for holding the lens such that the lens freely advances and retracts with respect to the main surface; and control means for controlling respective behaviors of the moving means and holding means; wherein, while emitting the second laser beam, the control means controls the moving means so as to move the object and the lens relative to each other along the main surface, the displacement acquiring means acquiring the displacement of the main surface along the line to cut; and wherein, while emitting the first laser beam, the control means controls the holding means so as to hold the lens while adjusting a gap between the lens and the main surface according to the displacement acquired by the displacement acquiring means, and controls the moving means so as to move the lens and the object relative to each other along the main surface, thereby forming the modified region.

Since the laser processing apparatus of the present invention acquires a displacement of the main surface along the line to cut, and forms a modified region while adjusting the gap between the lens and the main surface according to thus acquired displacement, it can form the modified region at a predetermined position within the object. Since the lens converging the first laser beam for processing also converges the second laser beam for measurement, the displacement of the main surface can be acquired more accurately.

It will be preferred in the laser processing apparatus of the present invention if, while emitting the second laser beam, the control means controls the moving means so as to move the object and the lens relative to each other along the main surface at a first speed, the displacement acquiring means acquiring the displacement of the main surface along the line to cut at a first time interval; and, while emitting the first laser beam, the control means controls the moving means so as to move the lens and the object relative to each other along the main surface at a second speed faster than the first speed, and controls the holding means so as to adjust the gap between the lens and the main surface at a second time interval shorter than the first time interval. Since control is made such that the displacement of the main surface is acquired at the first speed slower than the second speed for forming the modified region, the displacement of the main surface can accurately be acquired even when there is a large difference in level of the main surface, for example. Since control is made such that the modified region is formed at the second speed faster than the first speed for acquiring the displacement of the main surface, the processing efficiency improves. When the first speed, second speed, first time interval, and second time interval are set such that the distance interval along the line to cut for acquiring the displacement of the main surface equals the distance interval along the line to cut for adjusting the gap between the lens and the main surface at the time of forming the modified region, for example, the gap between the lens and the main surface can be adjusted more faithfully according to the acquired displacement of the main surface.

It will also be preferred in the laser processing apparatus of the present invention if the control means controls the holding means so as to hold the lens at a measurement initial position set such that a converging point of the second laser beam is located at a predetermined position with respect to the object; while starting the emission of the second laser beam with the lens being held at the measurement initial position, the control means controls the moving means so as to move the lens and the object relative to each other along the main surface, and controls the holding means so as to release the lens from being held at the measurement initial position in response to the reflected light of the second laser beam reflected by the main surface; and, after the release, the control means controls the holding means so as to adjust the gap between the lens and the main surface while detecting the reflected light of the second laser beam reflected by the main surface, the displacement acquiring means acquiring the displacement of the main surface along the line to cut. After one end part of the line to cut is irradiated with the second laser beam while the lens is held at the measurement initial position, i.e., after the lens overhangs the object as the lens and the object move relative to each other, the lens is released from being held, and the displacement of the main surface is acquired, whereby the displacement can be acquired while excluding the influence of fluctuations in the shape of end parts in the object as much as possible. Since the quantity of reflected light varies depending on the distance from the reflecting surface, the lens can be released from being held assuming that a part where the quantity of the reflected light undergoes a predetermined change corresponds to an outer edge of the main surface of the object, for example.

It will also be preferred in the laser processing apparatus of the present invention if the control means controls the holding means so as to set a processing initial position for holding the lens with respect to the main surface according to the displacement of the main surface along the line to cut acquired by the displacement acquiring means, and hold the lens at thus set processing initial position; while starting the emission of the first laser beam with the lens being held at the processing initial position, the control means controls the moving means so as to move the lens and the object relative to each other, thereby forming the modified region in one end part of the line to cut; and, after forming the modified region in the one end part, the control means controls the holding means so as to release the lens from being held at the processing initial position and adjust the gap between the lens and the object according to the displacement of the main surface acquired by the displacement acquiring means, and controls the moving means so as to move the lens and the object relative to each other, thereby forming the modified region. The modified region is formed in one end part of the line to cut while holding the lens at the processing initial position, and then is formed while the lens is released from being held and caused to follow the displacement of the main surface. Therefore, the modified region can be formed while excluding the influence of fluctuations in the shape of end parts in the object as much as possible.

It will also be preferred in the laser processing apparatus of the present invention if the displacement acquiring means emits the first laser beam when acquiring the displacement of the main surface, so as to form the modified region along the line to cut. This forms the modified region while acquiring the displacement of the main surface at the same time, whereby a single scan can perform the measurement and processing.

It will also be preferred in the laser processing apparatus of the present invention if the moving means is adapted to move the object toward the lens, and the control means controls the moving means such that the modified region formed along the line to cut when the displacement acquiring means acquires the displacement is formed between the modified region formed later along the line to cut and the main surface. The modified region formed in the processing step is positioned farther from the laser light irradiation side than is the modified region formed in the displacement acquiring step, whereby the modified region can be formed widely in the laser beam emitting direction.

It will also be preferred in the laser processing apparatus of the present invention if the line to cut includes first and second lines to cut; the control means controls the moving means so as to move the lens relative to the object in a first direction along the first line to cut, while the displacement acquiring means acquires the displacement of the main surface along the first line to cut, and then the control means controls the moving means such that the lens moves relative to the object in a second direction opposite from the first direction, while the displacement acquiring means acquires the displacement of the main surface along the second line to cut; and, after forming the modified region along the first line to cut in the first direction, the control means controls the moving means so as to form the modified region along the second line to cut in the second direction. Since the lens acquires the displacement along the first line to cut while moving in the first direction, and acquires the displacement along the second line to cut while moving in the second direction opposite from the first direction, displacements can be acquired as the lens moves back and forth with respect to the object. Since the respective modified regions are formed along the first and second lines to cut as the lens moves back and forth with respect to the object, modified regions can be formed more efficiently.

Effect of the Invention

The laser processing method and laser processing apparatus of the present invention can efficiently carry out laser processing while minimizing the deviation of the converging point of a laser beam.

BRIEF DESCRIPTION OF THE DRAWINGS

FIG. 4 is a view for explaining the laser processing method in accordance with an embodiment of the present invention.

FIG. 8 is a view for explaining the laser processing method in accordance with the embodiment.

EXPLANATION OF NUMERALS

1 . . . laser processing apparatus, 2 . . . stage, 3 . . . laser head unit, 4 . . . optical system main part, 5 . . . objective lens unit, 6 . . . laser emitting apparatus, 7 . . . control unit, S . . . object, R . . . modified region, 42 . . . processing objective lens, 43 . . . actuator, 13 . . . laser head, 44 . . . laser diode, 45 . . . light-receiving part.

BEST MODES FOR CARRYING OUT THE INVENTION

The findings of the present invention can easily be understood in view of the following detailed descriptions with reference to the accompanying drawings, which are represented for the purpose of illustration only. Embodiments of the present invention will now be explained with reference to the accompanying drawings. When possible, parts identical to each other will be referred to with numerals identical to each other without repeating their overlapping explanations.

Figure 1:
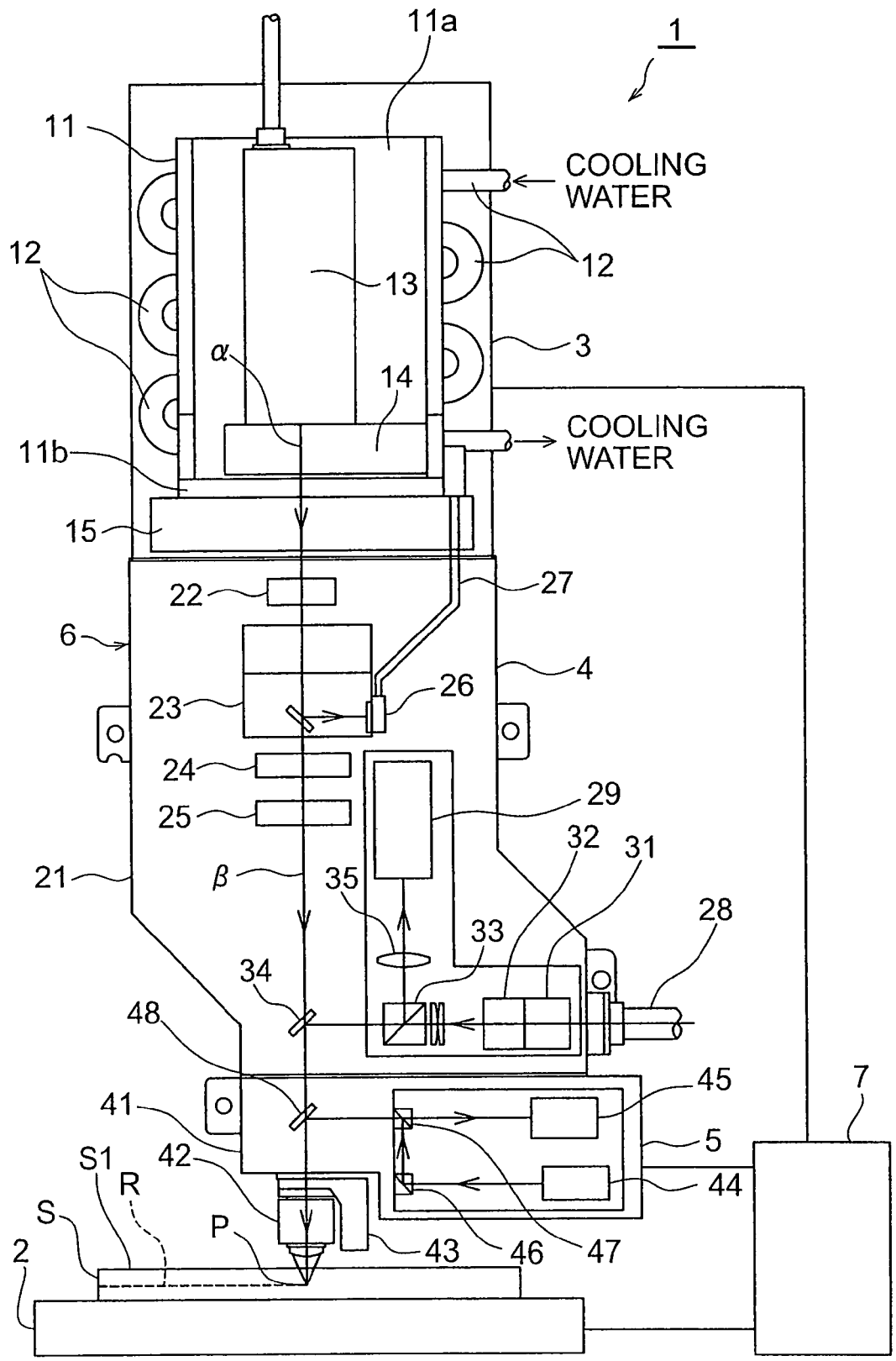
FIG. 1 is a view showing the configuration of the laser processing apparatus in accordance with an embodiment of the present invention.

The laser processing apparatus in accordance with an embodiment of the present invention will be explained with reference to FIG. 1. As shown in FIG. 1, this laser processing apparatus 1 is one which irradiates a planar object to be processed S mounted on a stage 2 (moving means) with a processing laser beam L1 (first laser beam) such that a converging point P is positioned within the object S, so as to form a modified region R caused by multiphoton absorption within the object S. The stage 2 is movable upward/downward and leftward/rightward and rotatable, whereas a laser emitting apparatus 6 mainly constituted by a laser head unit 3, an optical system main part 4, and an objective lens unit 5 is disposed above the stage 2. The laser processing apparatus 1 also comprises a control unit 7 (control means), which outputs control signals for controlling behaviors of the stage 2 and laser emitting apparatus 6 (the movement of stage 2, emission of laser beams from the laser emitting apparatus 6, etc.) thereto.

The laser head unit 3 is detachably attached to an upper end part of the optical system main part 4. The laser head unit 3 includes an L-shaped cooling jacket 11. Embedded in a vertical wall 11a of the cooling jacket 11 is a cooling pipe 12 in a winding state, through which cooling water circulates. Attached to the front face of the vertical wall 11a are a laser head 13 which emits the processing laser beam L1 downward, and a shutter unit 14 for selectively opening and closing an optical path of the processing laser beam L1 emitted from the laser head 13. This can prevent the laser head 13 and shutter unit 14 from overheating. For example, the laser head 13 uses an Nd:YAG laser and emits a pulsed laser beam having a pulse width of 1 μs or shorter as the processing laser beam L1.

In the laser head unit 3, an adjuster 15 for adjusting the inclination of the cooling jacket 11 and the like is attached to the lower face of a bottom wall 11b of the cooling jacket 11. The adjuster 15 is used for aligning an optical axis α of the processing laser beam L1 emitted from the laser head 13 with an axis β which is set in the optical system main part 4 and objective lens unit 5 such as to extend vertically. Namely, the laser head unit 3 is attached to the optical system main part 4 by way of the adjuster 15. When the inclination of the cooling jacket 11 or the like is adjusted by the adjuster 15 thereafter, the inclination of the laser head 13 or the like is adjusted in conformity to the movement of the cooling jacket 11. As a consequence, the processing laser beam L1 advances into the optical system main part 4 while in a state where its optical axis α coincides with the axis β. The bottom wall 11b of the cooling jacket 11, the adjuster 15, and a housing 21 of the optical system main part 4 are formed with through holes through which the processing laser beam L1 passes.

On the axis β within the housing 21 of the optical system main part 4, a beam expander 22 for enlarging the beam size of the processing laser beam L1 emitted from the laser head 13, an optical attenuator 23 for adjusting the output of the processing laser beam L1, an output observation optical system 24 for observing the output of the processing laser beam L1 adjusted by the optical attenuator 23, and a polarization adjusting optical system 25 for adjusting the polarization of the processing laser beam L1 are arranged in this order from the upper side to the lower side. A beam damper 26 for absorbing the eliminated laser beam is attached to the optical attenuator 23, and is connected to the cooling jacket 11 by way of a heat pipe 27. This can prevent the beam damper 26 having absorbed the laser beam from overheating.

For observing the object S mounted on the stage 2, a light guide 28 for guiding an observation visible ray is attached to the housing 21 of the optical system main part 4, whereas a CCD camera 29 is disposed within the housing 21. The observation visible ray is guided by the light guide 28 into the housing 21, successively passes through a field stop 31, a reticle 32, a dichroic mirror 33, and the like, and then is reflected by a dichroic mirror 34 disposed on the axis β. The reflected observation visible ray advances downward on the axis β and irradiates the object S. On the other hand, the processing laser beam L1 is transmitted through the dichroic mirror 34.

The reflected light beam of the observation visible ray reflected by a surface S1 of the object S advances upward on the axis β, and is reflected by the dichroic mirror 34. The light beam reflected by the dichroic mirror 34 is further reflected by the dichroic mirror 33, so as to pass through an imaging lens 35, etc., thereby entering the CCD camera 29. An image of the object S captured by the CCD camera 29 is displayed on a monitor (not depicted).

The objective lens unit 5 is detachably attached to the lower end part of the optical system main part 4. Since the objective lens unit 5 is positioned by a plurality of positioning pins with respect to the lower end part of the optical system main part 4, the axis β set in the optical system main part 4 and the axis β set in the objective lens unit 5 can easily be aligned with each other. By way of an actuator 43 (holding means) using a piezoelectric device, a processing objective lens 42 is mounted to the lower end of the housing 41 of the objective lens unit 5 while in a state where the optical axis coincides with the axis β. The housing 21 of the optical system main part 4 and the housing 41 of the objective lens unit 5 are formed with through holes through which the processing laser beam L1 passes. The peak power density of the processing laser beam L1 converged by the processing objective lens 42 is at least $1 \times 10^8$ (W/cm$^2$) at the converging point P.

In order to position the converging point P of the processing laser beam L1 at a predetermined depth from the surface S1 of the object S, a laser diode 44 for emitting a rangefinding laser beam L2 (second laser beam) and a light-receiving part 45 (light-receiving means) are disposed within the housing 41 of the objective lens unit 5. The rangefinding laser beam L2 is emitted from the laser diode 44, and is successively reflected by a mirror 46 and a half mirror 47, and then by a dichroic mirror 48 disposed on the axis β. The reflected rangefinding laser beam L2 advances downward on the axis β, and passes through the processing objective lens 42, thereby irradiating the surface S1 of the object S. On the other hand, the processing laser beam L1 passes through the dichroic mirror 48.

The reflected light beam of the rangefinding laser beam L2 reflected by the surface S1 of the object S reenters the processing objective lens 42, and advances upward on the axis β, so as to be reflected by the dichroic mirror 48. The reflected light beam of the rangefinding laser beam L2 reflected by the dichroic mirror 48 passes through the half mirror 47, so as to enter the light-receiving part 45, and is converged on a four-divided position detecting device (displacement acquiring means) in which a photodiode is equally divided into four. According to the converged image pattern of the reflected light beam of the rangefinding laser beam L2 converged onto the four-divided position detecting device, it can be detected where the converging point of the rangefinding laser beam L2 due to the processing objective lens 42 is positioned with respect to the surface S1 of the object S. Information about the converged image pattern of the reflected light beam of the rangefinding laser beam L2 converged on the four-divided position detecting device is outputted to the control unit 7. According to this information, the control unit 7 outputs a control signal for indicating to the actuator 43 a position for holding the processing objective lens 42.

Physically, the control unit 7 comprises an interface for exchanging signals with the stage 2 and laser emitting apparatus 6, a CPU (central processing unit), and a storage device such as memory or HDD. According to a program stored in the storage device, the CPU performs a predetermined information processing operation and outputs results of the information processing as control signals to the stage 2 and laser emitting apparatus 6.

Figure 2:
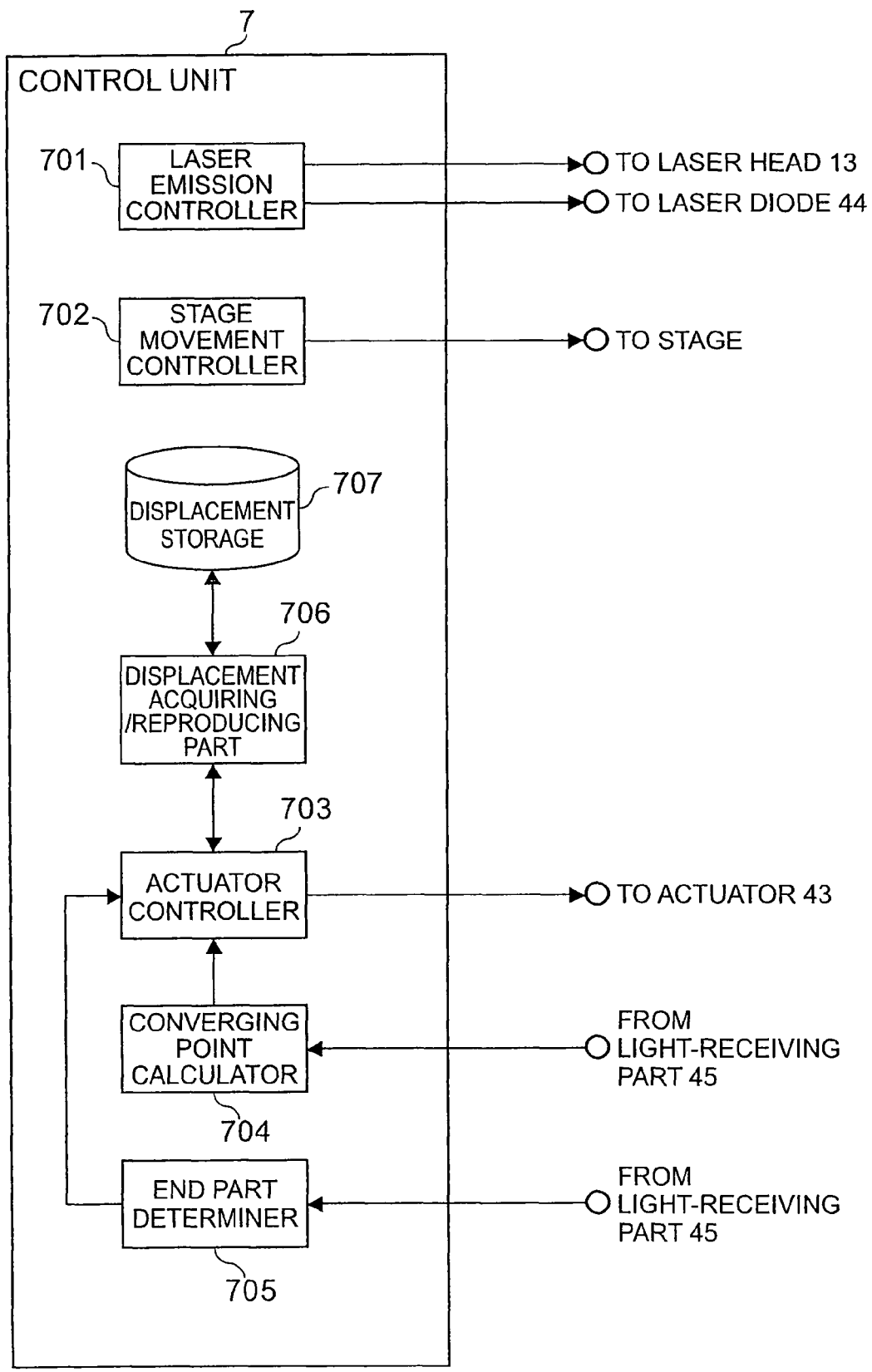
FIG. 2 is a diagram showing a functional configuration of a control unit provided in the laser processing apparatus in accordance with the embodiment.

FIG. 2 shows a functional configuration of the control unit 7. Functionally, as shown in FIG. 2, the control unit 7 comprises a laser emission controller 701, a stage movement controller 702, an actuator controller 703, a converging point calculator 704, an end part determiner 705, a displacement acquiring/reproducing part 706 (displacement acquiring means), and a displacement storage 707. The laser emission controller 701 is a part which outputs signals for controlling emissions of the processing laser beam L1 and rangefinding laser beam L2 to the laser head 13 of the laser head unit 3 and the laser diode 44 of the objective lens unit 5, respectively. The stage movement controller 702 is a part which outputs a control signal for controlling the movement of the stage 2 thereto. The actuator controller 703 is a part which outputs a control signal for controlling the driving of the actuator 43 of the objective lens unit 5 to the actuator 43. The displacement acquiring/reproducing part 706 is a part which reads the amount of expansion/contraction of the actuator 43 from the control signal outputted from the actuator controller 703 to the actuator 43, and stores the amount of expansion/contraction into the displacement storage 707. The displacement acquiring/reproducing part 706 is also a part which reads the amount of expansion/contraction stored in the displacement storage 707 and outputs the amount of expansion/contraction to the actuator controller 703. The actuator controller 703 outputs a control signal such that the actuator 43 is driven by the outputted amount of expansion/contraction. The amount of expansion/contraction varies depending on the displacement of the main surface S1 of the object S, and thus can be taken as an amount indicative of the displacement of the main surface S1. The converging point calculator 704 is a part which calculates the distance between the object S and the converging point of the rangefinding laser beam L2 according to an astigmatism signal outputted from the light-receiving part 45 of the objective lens unit 5. The end part determiner 705 is a part which determines whether the processing objective lens 42 is at a position corresponding to an end part of the object S or not according to the quantity of light received by the light-receiving part 45. Operations of the individual functional constituents will be explained later.

An outline of a laser processing method carried out by thus configured laser processing apparatus 1 will now be explained. First, the object S is mounted on the stage 2, and the stage 2 is moved such that the converging point P of the processing laser beam L1 is positioned within the object S. The initial position of the stage 2 is determined by the thickness and refractive index of the object S, the numerical aperture of the processing objective lens 42, etc.

Subsequently, the processing laser beam L1 is emitted from the laser head 13, the rangefinding laser beam L2 is emitted from the laser diode 44, and the stage 2 is moved such that the processing laser beam L1 and rangefinding laser beam L2 converged by the processing objective lens 42 scan a desirable line (line to cut) of the object S. Here, the light-receiving part 45 detects the reflected light beam of the rangefinding laser beam L2, and the control unit 7 controls the actuator 43 in a feedback fashion such that the converging point P of the processing laser beam L1 is always positioned at a predetermined depth from the surface S1 of the object S, whereby the position of the processing objective lens 42 is minutely adjusted along the axis β.

Therefore, even when the surface S1 of the object S wobbles, for example, a modified region R caused by multiphoton absorption can be formed at a position located at a predetermined depth from the surface S1. Forming the linear modified region R within the planar object S as such can generate a cleavage from the linear modified region R acting as a start point, whereby the object S can be cut easily with a high precision along the linear modified region R.

The laser processing method using the laser processing apparatus 1 of this embodiment will be explained more specifically. The explanation of the laser processing method will also illustrate operations of the laser processing apparatus 1. The laser processing method in accordance with this embodiment can be divided into a displacement acquiring step of acquiring the displacement of the surface S1 (main surface) of the wafer-like object S, and a processing step of emitting the processing laser beam L1 so as to form a modified region. Each of the displacement acquiring step and processing step will be explained.

Figure 3:
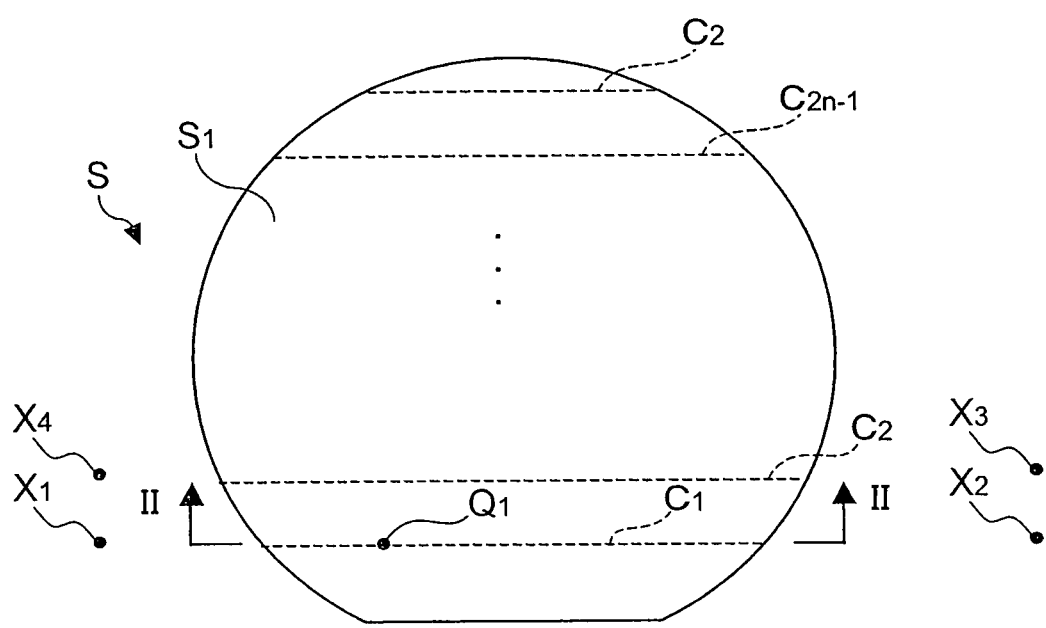
FIG. 3 is a view showing an object to be processed for explaining the embodiment.

First, the wafer-like object S used in this explanation will be explained with reference to FIG. 3. In the object S, 2n lines to cut $C_1$ to $C_{2n}$ are set. The lines to cut $C_1$ to $C_{2n}$ are subjected to laser processing in groups of two each. In the case of the lines to cut $C_1$ and $C_2$, for example, the displacement of the line to cut $C_1$ is acquired from a point $X_1$ to a point $X_2$ on an extension of the line to cut $C_1$, and then the displacement of the line to cut $C_2$ is acquired from a point $X_3$ to a point $X_4$ on an extension of the line to cut $C_2$. When displacements are acquired as such, the stage 2. (see FIG. 1) can efficiently be moved such that the processing objective lens 42 (see FIG. 1) shifts from the point $X_1$ to the point $X_2$ and then in reverse from the point $X_3$ to the point $X_4$. After the displacements concerning the lines to cut $C_1$ and $C_2$ are acquired, while reproducing the amount of movement of the actuator 43 according to thus acquired displacements, a modified region is formed along the line to cut $C_1$ from the point $X_1$ to $X_2$ on the extension of the line to cut $C_1$, and then a modified region is formed along the line to cut $C_1$ from the point $X_3$ to $X_4$ on the extension of the line to cut $C_2$.

(Displacement Acquiring Step) The displacement acquiring step of acquiring the displacement of the surface S1 along the lines to cut $C_1$ to $C_n$ in the wafer-like object S will now be explained.

The explanation will be made with reference to FIGS. 4(A) to 4(C). FIGS. 4(A) to 4(C) are views showing the cross section II-II of FIG. 3. For easier understanding, the hatching indicating the cross section is omitted in FIGS. 4(A) to 4(C). As shown in FIG. 4(A), the object S is attracted and secured to the stage 2 by way of a dicing film 2a. The dicing film 2a is secured with a dicing ring (not depicted).

As shown in FIG. 4(A), the stage 2 moves such that the processing objective lens 42 is placed at a position corresponding to a point $Q_1$ on the line to cut $C_1$ in the object S. The actuator 43 holding the processing objective lens 42 is in a state expanded by 25 μm from the most contracted state. This amount of expansion, i.e., 25 μm, is set as one half of the maximum amount of expansion of the actuator 43, i.e., 50 μm. In this state, the stage 2 is moved up/down so that a reflected light beam of the observation visible ray is in focus. In this in-focus state, the rangefinding laser beam L2 is emitted, an astigmatism signal is obtained according to a reflected light beam of the rangefinding laser beam L2, and the value of the astigmatism signal is taken as a reference value.

Subsequently, as shown in FIG. 4(B), the stage 2 is moved such that the processing objective lens 42 is placed at a position corresponding to the point $X_1$ on an extension of the line to cut $C_1$ while keeping the amount of expansion of the actuator 43 in the state of FIG. 4(A). The position of the processing objective lens 42 with respect to the object S in the vertical direction shown in FIG. 4(B) is the initial position (measurement initial position). Thereafter, the stage 2 moves such that the processing objective lens 42 shifts in the direction of arrow F in FIG. 4(B) (measurement preparatory step).

The rangefinding laser beam L2 is reflected less by the dicing film 2a so that the total quantity of light reflected thereby is smaller, whereas the total quantity of reflected light increases in the object S. Namely, the total quantity of reflected light beam of the rangefinding laser beam L2 detected by the four-divided position detecting device in the light-receiving part 45 (see FIG. 1) increases, whereby it can be determined that the processing objective lens 42 is located at a position intersecting the line to cut $C_1$ in the object S when the total quantity of reflected light beam exceeds a predetermined threshold. Therefore, when the total light quantity detected by the four-divided position detecting device in the light-receiving part 45 (see FIG. 1) is greater than the predetermined threshold, the processing objective lens 42 is assumed to be located at one end of the line to cut $C_1$, and expansion amount control of the actuator 43 is started so as to release the expansion amount of the actuator 43 from being held at this time, such that the astigmatism signal becomes the reference value (first measurement step).

Hence, when the processing objective lens 42 moves in the direction of arrow F in FIG. 4(B), the state shown in FIG. 4(C) is attained. As shown in FIG. 4(C), area $G_1$ (one end part) becomes a transition area in which the processing objective lens 42 shifts from the held state to a state capable of following the displacement of the surface S1 of the object S, whereby the amount of movement of the actuator 43 does not correspond to the displacement of the surface S1 in this area. In the next area $G_2$ in which the amount of expansion of the actuator 43 is released from being held and the expansion amount control for the actuator 43 is carried out such that the astigmatism signal becomes the reference value, the amount of movement of the actuator 43 corresponds to the displacement of the surface S1. Therefore, the track G of the change in expansion amount of the actuator 43 corresponds to the displacement of the surface S1. Thereafter, when the processing objective lens 42 is located at the other end of the line to cut $C_1$ as shown in FIG. 4(C), the total light quantity detected by the four-divided position detecting device in the light-receiving part 45 (see FIG. 1) decreases. Hence, when the total light quantity detected by the four-divided position detecting device in the light-receiving part 45 (see FIG. 1) becomes smaller than a predetermined threshold, the processing objective lens 42 is assumed to be located at a position corresponding to one end of the line to cut $C_1$, the amount of expansion of the actuator at this time is held, and the recording of the track G is terminated. Information of the track G is stored into the displacement storage 707 (second measurement step).

Figure 5:
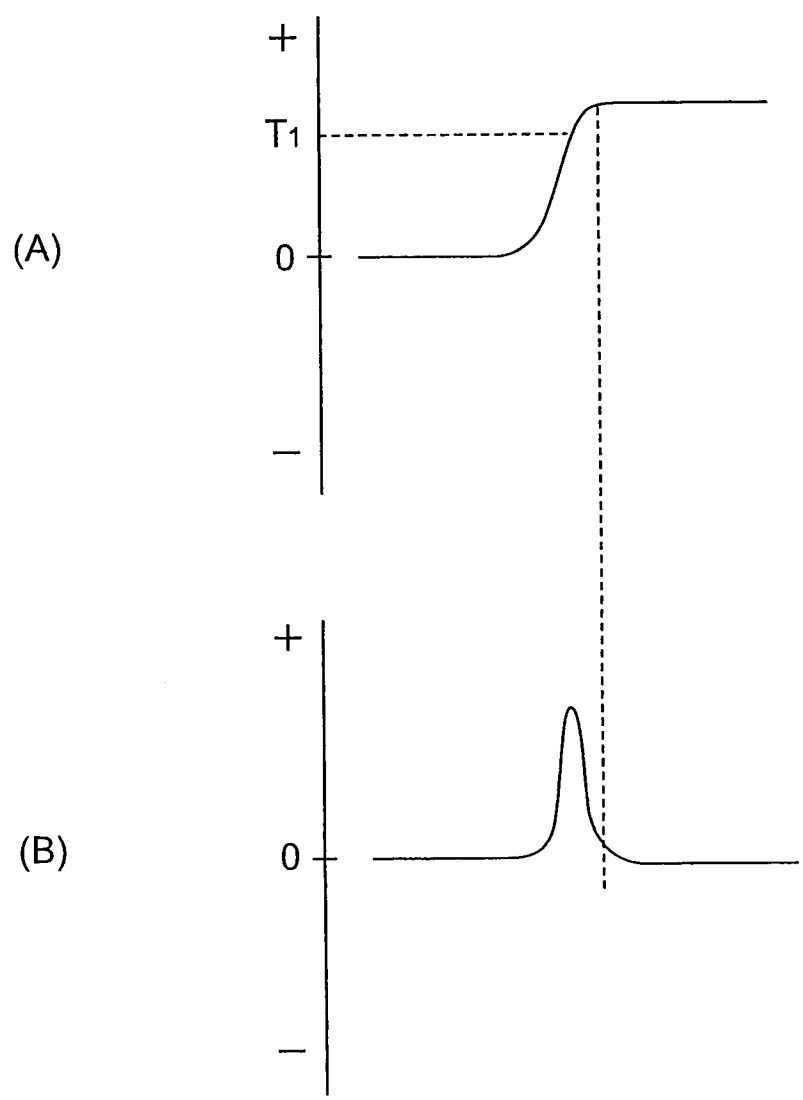
FIG. 5 is a chart for explaining the laser processing method in accordance with the embodiment.

Though the processing objective lens 42 having reached a position corresponding to one end of the line to cut $C_1$ is detected according to the fact that the total light quantity detected by the four-divided position detecting device in the light-receiving part 45 (see FIG. 1) exceeds a predetermined threshold in the foregoing explanation, this is not restrictive, whereby other criteria may also be employed. An example of such criteria will be explained with reference to FIGS. 5(A) and 5(B). FIG. 5(A), whose ordinate and abscissa indicate the total light quantity detected by the four-divided position detecting device of the light-receiving part 45 (see FIG. 1) and time, respectively, is a chart recording the change in the total light quantity detected by the four-divided position detecting device of the light-receiving part 45 (see FIG. 1). In this case, as mentioned above, it is determined that the processing objective lens 42 is located at a position corresponding to one end of the line to cut $C_1$ at the time when the light quantity exceeds a predetermined threshold $T_1$.

From the graph of FIG. 5(A), at predetermined intervals (e.g., at individual sampling points), the amount of change in difference obtained by subtracting the previous total light quantity value from the current total light quantity value is calculated. Thus obtained values are plotted in FIG. 5(B) whose ordinate and abscissa indicate the amount of change and time, respectively. In this case, a part exhibiting a positive peak seems to be a point where the change in the total light quantity is the largest, i.e., a part corresponding to the vicinity of the center of an edge (outer edge) of the object S. Therefore, the tracking of the actuator 43 can be started after the differential peak shown in FIG. 5(B) stops changing after the total light quantity shown in FIG. 5(A) becomes the threshold $T_1$.

Figure 6:
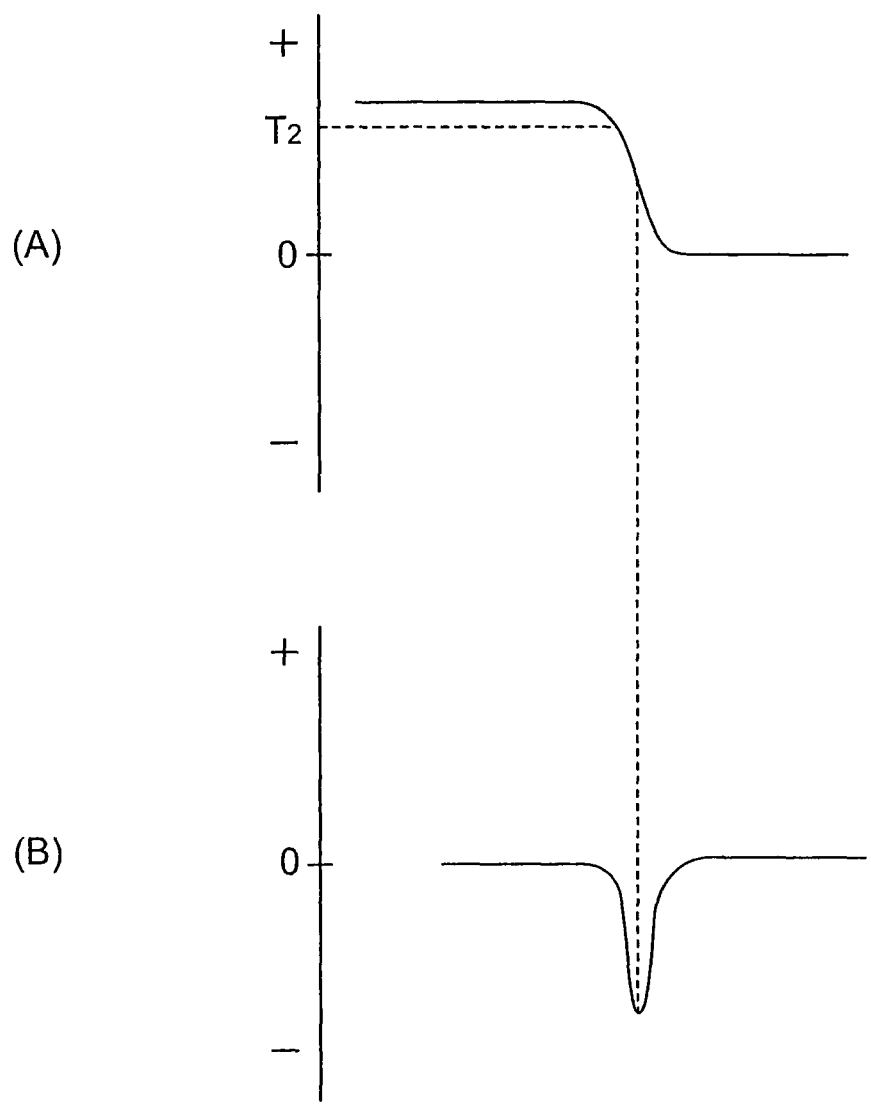
FIG. 6 is a chart for explaining the laser processing method in accordance with the embodiment.

Though the processing objective lens 42 having reached a position corresponding to the other end of the line to cut $C_1$ is detected according to the fact that the total light quantity detected by the four-divided position detecting device in the light-receiving part 45 (see FIG. 1) becomes smaller than a predetermined threshold in the foregoing explanation, this is not restrictive, whereby other criteria may also be employed. An example of such criteria will be explained with reference to FIGS. 6(A) and 6(B). FIG. 6(A), whose ordinate and abscissa indicate the total light quantity detected by the four-divided position detecting device of the light-receiving part 45 (see FIG. 1) and time, respectively, is a chart recording the change in the total light quantity detected by the four-divided position detecting device of the light-receiving part 45 (see FIG. 1). In this case, as mentioned above, it is determined that the processing objective lens 42 is located at a position corresponding to one end of the line to cut $C_1$ at the time when the light quantity becomes smaller than a predetermined threshold $T_2$.

From the graph of FIG. 6(A), at predetermined intervals (e.g., at individual sampling points), the amount of change in difference obtained by subtracting the previous total light quantity value from the current total light quantity value is calculated. Thus obtained values are plotted in FIG. 6(B) whose ordinate and abscissa indicate the amount of change and time, respectively. In this case, a part exhibiting a negative peak seems to be a point where the change in the total light quantity is the largest, i.e., a part corresponding to the vicinity of the center of an edge (outer edge) of the object S. Therefore, the amount of expansion/contraction of the actuator 43 can be fixed at that corresponding to this part, and the recording of the amount of expansion/contraction can be stopped.

Figure 7:
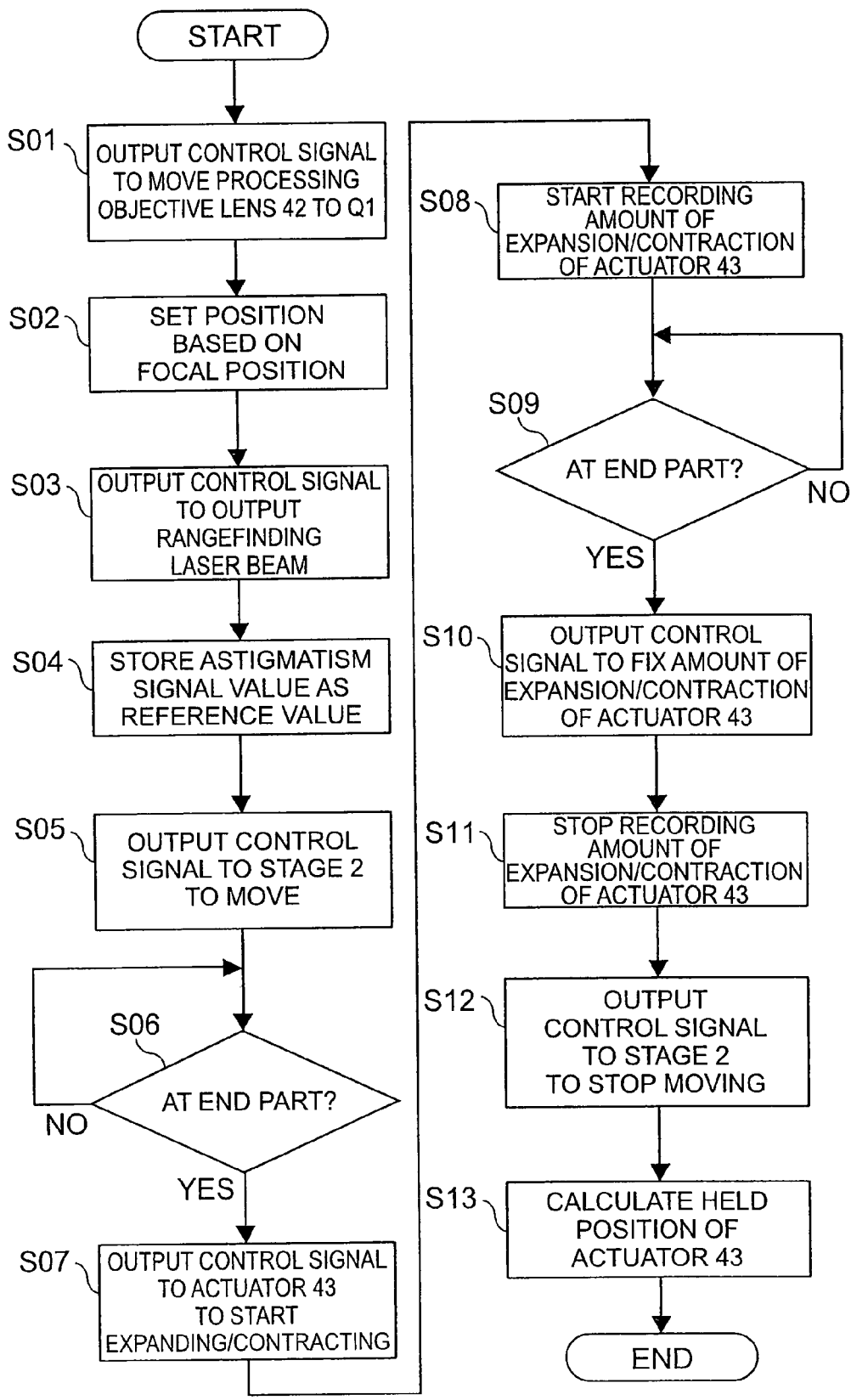
FIG. 7 is a flowchart for explaining the laser processing method in accordance with the embodiment.

Operations of the laser processing apparatus 1 in the displacement acquiring step will be explained with reference to the flowchart shown in FIG. 7. The stage controller 702 of the control unit 7 outputs a control signal to the stage 2 so as to move the processing objective lens 42 to a point $Q_1$ on the $C_1$ (step S01). In response to the output of this control signal, the stage 2 moves. The actuator controller 703 of the control unit 7 outputs a control signal to the actuator 43 so as to make the latter expand by 20 μm. In response to the output of this control signal, the actuator 43 expands by 20 μm. In this state, the stage 2 is moved up/down so that the observation visible ray is in focus therewith, and a focal position of the observation visible ray is set (step S02).

The laser emission controller 701 of the control unit 7 outputs a control signal to the laser diode 44 so as to make the latter emit the rangefinding laser beam L2 (step S03). In response to the output of this control signal, the laser diode 44 emits the rangefinding laser beam L2, whereas its reflected light beam reflected by the surface S1 of the object S is received by the four-divided position detecting device in the light-receiving part 45. In response to the light received, signals are outputted to the converging point calculator 704 and the end part determiner 705.

The converging point calculator 704 holds the value of astigmatism signal in this state as a reference value (step S04). Subsequently, the stage movement controller 702 outputs a control signal to the stage 2 such that the processing objective lens 42 moves to a position corresponding to $X_1$ on an extension of the line to cut $C_1$ in the object S (step S05). The stage 2 moves in response to the output of this control signal, whereby the processing objective lens 42 shifts to the position corresponding to $X_1$ on the extension of the line to cut $C_1$ in the object S.

Subsequently, the stage movement controller 702 outputs a control signal to the stage 2 so as to move the processing objective lens 42 in the direction of arrow F in FIG. 4(B). In response to the output of the control signal, the stage 2 moves, whereby the processing objective lens 42 starts moving in the direction of arrow F.

According to the signal outputted from the light-receiving part 45, the end part determiner 705 of the control unit 7 determines whether the processing objective lens 42 is located at an end part of the object S or not (step S06). When it is determined that the processing objective lens 42 is located at an end part of the object S, the end part determiner 705 outputs an instruction signal to the actuator controller 703 so as to make the latter start the expansion/contraction of the actuator 43 such that the astigmatism signal equals the held reference value. The actuator controller 703 outputs the control signal to the actuator 43 so as to make the latter start expanding/contracting in order for the astigmatism signal to equal the held reference value (step S07). In response to the output of this control signal, the actuator 43 expands/contracts according to the displacement of the surface S1 of the object S, and holds the processing objective lens 42 such that the astigmatism signal becomes the held value (such that the distance between the processing objective lens 42 and the surface S1 of the object S becomes constant). Therefore, the track G of the amount of expansion/contraction of the actuator 43 is formed in conformity to the displacement of the surface S1 of the object S (see FIG. 4(C)). The displacement acquiring/reproducing part 706 in the control unit 7 starts recording the amount of expansion/contraction of the actuator 43 (step S08).

According to the signal outputted from the light-receiving part 45, the end part determiner 705 determines whether the processing objective lens 42 is located at the other end part of the object S or not (step S09). When it is determined that the processing objective lens 42 is located at an end part of the object S, the end part determiner 705 outputs an instruction signal to the actuator controller 703 so as to make the latter stop the expansion/contraction of the actuator 43. In response to the output of this instruction signal, the actuator controller 703 outputs a control signal to the actuator 43 so as to make the latter stop expanding/contracting and attain a held state (step S10). In response to the output of this control signal, the actuator 43 stops expanding/contracting. In response to the output of the control signal from the actuator controller 703 to the actuator 43, the displacement acquiring/reproducing part 706 terminates the recording of the amount of expansion/contraction of the actuator 43 (step S11). When the processing objective lens 42 is located at the point $X_2$ on an extension of the line to cut $C_1$, the stage movement controller 702 outputs a control signal to the stage 2 so as to make the latter stop moving (step S12). Thereafter, an average value of the amounts of expansion/contraction of the actuator 43 stored as those recorded before a predetermined time from when the recording is terminated among the amounts of expansion/contraction of the actuator 43 stored in the displacement storage 707 is calculated, and the amount of expansion/contraction of the actuator 43 is fixed so as to become this average value (step S13).

(Processing Step) The processing step of emitting the processing laser beam L1 and rangefinding laser beam L2 will now be explained.

The explanation will be set forth with reference to FIGS. 8(A) to 8(C) showing the cross section II-II of FIG. 3 as with FIGS. 4(A) to 4(C). For easier understanding, the hatching indicating the cross section is omitted in FIGS. 8(A) to 8(C). FIG. 8(A) shows a state where the processing objective lens 42 has started forming a modified region on the line to cut $C_1$. Before attaining the state of FIG. 8(A), the stage 2 is further raised by a predetermined distance (hereinafter referred to as processing height), such that the distance between the surface S1 of the object S and the processing objective lens 42 is set shorter by the processing height. Here, assuming that the focal point of the visible range and the converging point of the laser beam coincide with each other, the processing laser beam L1 is converged at a position corresponding to the value of product of the processing height from the surface S1 and the refractive index of the object S at the laser wavelength within the object S. When the object S is a silicon wafer having a refractive index of 3.6 (at a wavelength of 1.06 μm) and a processing height of 10 μm, for example, the processing laser beam L1 is converged at a position of 3.6×10=36 μm.

The actuator 43 is fixed at the amount of expansion set in FIG. 4(C), whereby the processing objective lens 42 is disposed at the initial position (processing initial position). Before the state of FIG. 4(C) shifts to the state of FIG. 8(A), the processing laser beam L1 and the rangefinding laser beam L2 are emitted. The stage 2 moves such that the processing objective lens 42 shifts in the direction of arrow H (processing preparatory step).

The rangefinding laser beam L2 is reflected less by the dicing film 2a so that the total quantity of light reflected thereby is smaller, whereas the total quantity of reflected light increases in the object S. Namely, the total quantity of reflected light beam of the rangefinding laser beam L2 detected by the four-divided position detecting device in the light-receiving part 45 (see FIG. 1) increases, whereby it can be determined that the processing objective lens 42 is located at a position intersecting the line to cut $C_1$ in the object S when the total quantity of reflected light beam exceeds a predetermined threshold. Therefore, when the total light quantity detected by the four-divided position detecting device in the light-receiving part 45 (see FIG. 1) is greater than the predetermined threshold, the processing objective lens 42 is assumed to be located at one end of the line to cut $C_1$, and expansion amount control of the actuator 43 is started so as to release the expansion amount of the actuator 43 from being held at this time. The amount of expansion is controlled according to the track G of the expansion amount of the actuator 43 acquired as explained with reference to FIGS. 4(A) to 4(C). More specifically, the displacement acquiring/reproducing part 706 generates reproducing information according to the information of track G stored in the displacement storage 707, and the actuator controller 703 outputs a control signal to the actuator 43 according to the reproducing information outputted from the displacement acquiring/reproducing part 706 to the actuator controller 703. Therefore, when the processing objective lens 42 moves in the direction of arrow H in FIG. 6(A), the state shown in FIG. 8(B) is attained. As shown in FIG. 8(B), the modified region R is formed by a fixed processing height in area J (one end part). After the modified region R is formed by the fixed processing height in this area J, the processing objective lens 42 moves along the line to cut $C_1$, thereby forming the modified region R with the processing laser beam L1 (first processing step).

When the processing objective lens 42 further moves in the direction of arrow H in FIG. 8(A) from the state shown in FIG. 8(B), the processing objective lens 42 is located at the other end of the line to cut $C_1$ as shown in FIG. 8(C). When the processing objective lens 42 reaches a position outside of the object S, the state opposite from that explained with reference to FIG. 8(A) is attained, whereby the total quantity of the reflected light beam of the rangefinding laser beam L2 detected by the four-divided position detecting device in the light-receiving part 45 (see FIG. 1) becomes smaller. Therefore, when the total light quantity detected by the four-divided position detecting device in the light-receiving part 45 (see FIG. 1) becomes smaller, the processing objective lens 42 is assumed to be located at a position corresponding to one end of the line to cut $C_1$ (in the state corresponding to FIG. 8(C)), the amount of expansion of the actuator at this time is held. The stage 2 moves such that the processing objective lens 42 reaches the position of $X_2$ in FIG. 8(C) while keeping the amount of expansion of the actuator 43, so as to be ready for the processing of the next line to cut $C_2$ (second processing step).

Though the processing objective lens 42 having reached the position corresponding to one end of the line to cut is detected according to the fact that the total light quantity detected by the four-divided position detecting device in the light-receiving part 45 (see FIG. 1) becomes greater than a predetermined threshold in the above explanation, other criteria can be employed as explained in the displacement acquiring step. Though the processing objective lens located at the position corresponding to the other end of the line to cut is detected according to the fact that the total light quantity detected by the four-divided position detecting device in the light-receiving part 45 (see FIG. 1) becomes smaller than a predetermined threshold in the above explanation, other criteria can be employed as explained in the displacement acquiring step.

Figure 9:
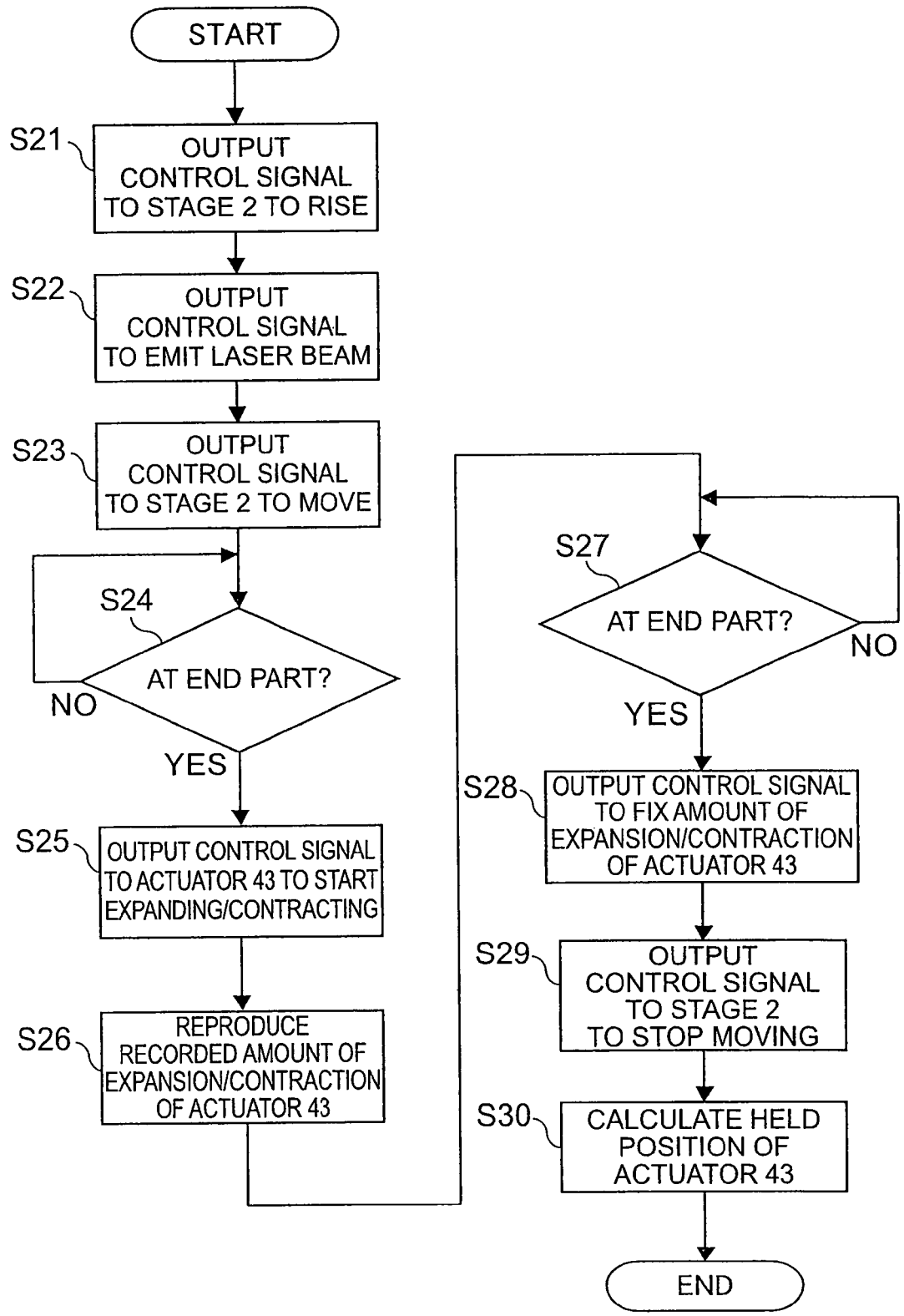
FIG. 9 is a flowchart for explaining the laser processing method in accordance with the embodiment.

Operations of the laser processing apparatus 1 in this processing step will be explained with reference to the flowchart shown in FIG. 9.

The stage movement controller 702 of the control unit 7 outputs a control signal to the stage 2 so as to make the latter rise by the processing height (step S21). In response to the output of this control signal, the stage 2 rises by the processing height.

The laser emission controller 701 of the control unit 7 outputs control signals to the laser head 13 and laser diode 44 so as to make them emit the processing laser beam L1 and the rangefinding laser beam L2, respectively (step S22). In response to the output of the control signals, the processing laser beam L1 and the rangefinding laser beam L2 are emitted.

The stage controller 702 of the control unit 7 outputs a control signal to the stage 2 so as to move the processing objective lens 42 in the direction of arrow H in FIG. 8(A) (step S23). In response to the output of this control signal, the stage 2 starts moving.

According to the signal outputted from the light-receiving part 45, the end part determiner 705 of the controller 7 determines whether the processing objective lens 42 is located at an end part of the object S or not (step S24). When it is determined that the processing objective lens 42 is located at an end part of the object S, the end part determiner 705 outputs an instruction signal to the actuator controller 703 so as to make the latter start the expansion/contraction of the actuator 43 and hold the converging point position of the rangefinding laser beam L2. The actuator controller 703 outputs the control signal to the actuator 43 so as to make the latter start expanding/contracting in order for the astigmatism signal to equal the held reference value (step S25). In response to the output of this control signal, the actuator 43 holds the processing objective lens 42 according to the amount of expansion/contraction (track G) recorded beforehand (step S26). Therefore, the modified region R is formed at a position corresponding to the displacement of the surface S1 of the object S (see FIG. 8(B)).

According to the signal outputted from the light-receiving part 45, the end part determiner 705 determines whether the processing objective lens 42 is located at the other end part of the object S or not (step S27). When it is determined that the processing objective lens 42 is located at the end part of the object S, the end part determiner 705 outputs an instruction signal to the actuator controller 703 so as to make the latter stop the expansion/contraction of the actuator 43. In response to the output of this instruction signal, the actuator controller 703 outputs a control signal to the actuator 43 so as to make the latter stop expanding/contracting and attain a held state (step S28). In response to the output of this control signal, the actuator 43 stops expanding/contracting. When the processing objective lens 42 is located at the point $X_2$ on an extension of the line to cut $C_1$, the stage movement controller 702 outputs a control signal to the stage 2 so as to make the latter stop moving (step S29). Thereafter, an average value of the amounts of expansion/contraction of the actuator 43 stored as those recorded before a predetermined time from when the recording is terminated among the amounts of expansion/contraction of the actuator 43 stored in the displacement storage 707 is calculated, and the amount of expansion/contraction of the actuator 43 is fixed so as to become this average value (step S30).

The above-mentioned preparatory step and processing step are performed for all the lines to cut $C_1$ to $C_n$ in the object S, whereby respective modified regions R are formed along the lines to cut $C_1$ to $C_n$.

Figure 10:
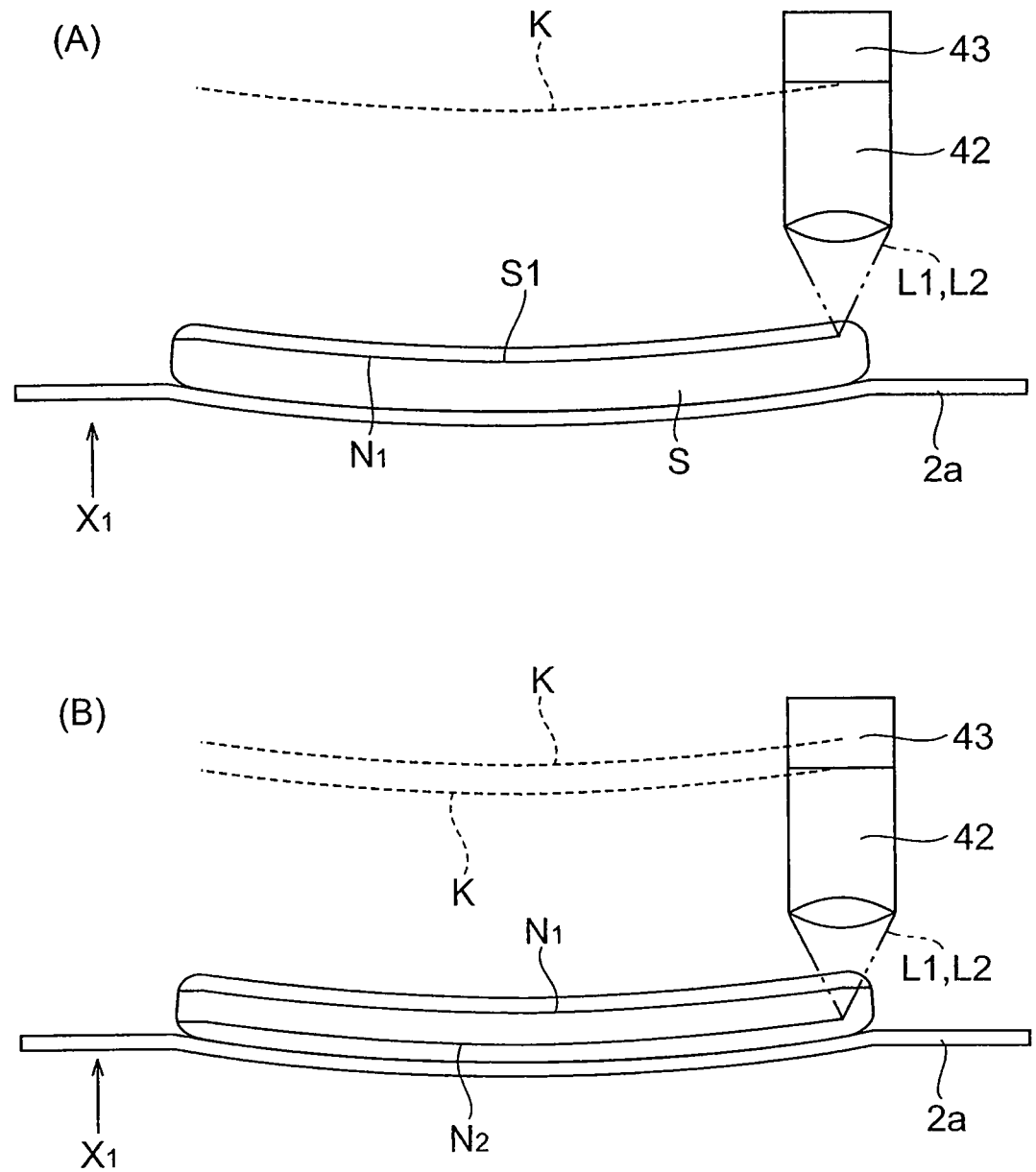
FIG. 10 is a flowchart for explaining the laser processing method in accordance with the embodiment.

Though this embodiment relates to a case where one stage of the modified region R is generated, a plurality of stages of modified regions may be formed. The latter case will be explained with reference to FIGS. 10(A) and 10(B) in comparison with FIGS. 4(A) to 4(C). In FIGS. 4(A) to 4(C), the displacement of the surface S1 of the object S is acquired according to the focal position of the observation visible ray converged by the processing objective lens 42. When the stage 2 is raised by the processing height in FIG. 4(A) and the resulting astigmatism signal is taken as the reference signal, the converging point of the laser beam can be positioned within the object S. When the stage 2 is moved in this state while being irradiated with the processing laser beam L1 and the rangefinding laser beam L2, the state shown in FIG. 10(A) is obtained. Namely, while a modified region $N_1$ is formed by the processing laser beam L1 within the object S, a track K conforming to the displacement of the surface S1 of the object S can be acquired if the amount of expansion/contraction of the actuator 43 is recorded. Subsequently, the stage 2 is further raised, and laser processing is performed while reproducing the amount of expansion/contraction of the actuator 43 recorded as the track K as explained with reference to FIGS. 8(A) to 8(C), whereby a modified region $N_2$ is formed within the object S at a position conforming to the displacement of its surface S1.

Performing laser processing while recording the displacement of the surface S1 of the object S as such can form the modified region more efficiently. When acquiring the displacement of the surface S1 of the object S, the converging point of the rangefinding laser beam L2 is formed within the object S. Therefore, the beam diameter of the rangefinding laser beam L2 on the surface S1 of the object S becomes greater, and thus can reduce the influence caused by the state of the surface S1 (such as streaks of grinding scars caused by back-grinding).

Though the moving speed of the stage 2 in the displacement acquiring step and that in the processing step are set identical to each other, it will also be preferred if they differ from each other. More specifically, the moving speed of the stage 2 in the displacement acquiring step (first speed) is set slower than the moving speed of the stage 2 in the processing step (second speed). In this case, the sampling period for acquiring the displacement of the main surface S1 in the displacement acquiring step (first time interval) is set longer than the sampling period for driving the actuator 43 in the processing step (second time interval). For example, the displacement acquiring step moves the stage 2 at a speed of 60 m/s and uses a sampling period of 1 ms, whereas the processing step moves the stage 2 at a speed of 300 m/s and uses a sampling period of 0.2 ms. Since the product of the moving speed and the sampling period becomes a pitch (distance interval in the direction of the line to cut) in each operation, the pitch for acquiring the main surface S1 in the displacement acquiring step and the pitch for driving the actuator 43 in the processing step become the same, whereby the recording pitch coincides with the reproducing pitch. Such a setting lowers the moving speed of the stage 2 in the displacement acquiring step, so as to be able to follow the main surface S1 of the object S even when there are large irregularities. This does not lower the processing efficiency, since the processing speed in the processing step is the same.

In this embodiment, the amount of expansion/contraction of the actuator 43 is acquired along the line to cut as one corresponding to the displacement of the surface S1 of the object S, and a modified region is formed while adjusting the gap between the processing objective lens 42 and the surface S1 by making the actuator 43 expand/contract according to thus acquired amount of expansion/contraction, whereby the modified region can stably be formed at a predetermined position within the object S. Since the processing objective lens 42 converging the processing laser beam L1 converges the rangefinding laser beam L2, deviations can be prevented from occurring due to exchanges of lenses and so forth, whereby the displacement of the surface S1 can be acquired more accurately.

The processing objective lens 42 and the object S move relative to each other and, after the processing objective lens 42 overhangs the object S, the processing objective lens 42 is released from being held at the initial position, so as to acquire the displacement of the surface S1, whereby the displacement can be acquired while excluding the influence of fluctuations in the shape of end parts in the object S as much as possible.

The modified region is formed in one end part of the line to cut while holding the processing objective lens at the initial position, and then is formed in conformity to the displacement of the surface S1 acquired beforehand while releasing the processing objective lens 42 from being held, whereby the modified region can be formed while excluding the influence of fluctuations in the shape of end parts in the object S as much as possible.

Since the modified region can stably be formed along the line to cut, when cutting/separating a wafer, which is an object to be processed, into chips by expanding the dicing film $2a$ and so forth after forming the modified region, the wafer can always be cut stably with a favorable cutting quality even when cutting a large amount of wafer.

INDUSTRIAL APPLICABILITY

The laser processing method and laser processing apparatus of the present invention can efficiently carry out laser processing while minimizing the deviation of the converging point of a laser beam.

The invention claimed is:
1. A laser processing method for irradiating an object to be processed with a first laser beam while converging the first laser beam with a lens such that a converging point is positioned within the object, and forming a modified region within the object along a cutting line, the method comprising:
   a height acquiring step of irradiating the object with a second laser beam for measuring height of a main surface of the object in an optical axis direction of the lens while converging the second laser beam with the lens, and acquiring the height of the main surface along the cutting line by detecting reflected light reflected by the main surface in response to the irradiation of the object with the second laser beam; and
   a processing step of emitting the first laser beam and moving the lens and the object relative to each other in a perpendicular direction to the optical axis direction of the lens while adjusting a distance between the lens and the main surface according to the acquired height, so as

19 to form the modified region along the cutting line in a predetermined depth relative to the main surface of the object;

wherein the height acquiring step is performed at a first time interval while moving the lens and the object relative to each other at a first speed in the perpendicular direction to the optical axis direction of the lens; and wherein the processing step is performed at a second time interval shorter than the first time interval while moving the lens and the object relative to each other at a second speed faster than the first speed in the perpendicular direction to the optical axis direction of the lens.

2. A laser processing method for irradiating an object to be processed with a first laser beam while converging the first laser beam with a lens such that a converging point is positioned within the object, and forming a modified region within the object along a cutting line, the method comprising:

a height acquiring step of irradiating the object with a second laser beam for measuring height of a main surface of the object in an optical axis direction of the lens while converging the second laser beam with the lens, and acquiring the height of the main surface along the cutting line by detecting reflected light reflected by the main surface in response to the irradiation of the object with the second laser beam; and a processing step of emitting the first laser beam and moving the lens and the object relative to each other in a perpendicular direction to the optical axis direction of the lens while adjusting a distance between the lens and the main surface in the optical axis direction of the lens according to the acquired height, so as to form the modified region along the cutting line in a predetermined depth relative to the main surface of the object;

wherein the height acquiring step comprises:

a measurement preparatory step of holding the lens at a measurement initial position set such that a converging point of the second laser beam is located at a predetermined position with respect to the object;

a step of starting emitting of the second laser beam while holding the lens at the measurement initial position, moving the lens and the object relative to each other in the perpendicular direction to the optical axis direction of the lens by releasing the lens from the measurement initial position in response to reflected light of the second laser beam reflected by the main surface; and a step of adjusting the distance between the lens and the main surface after said releasing by detecting the reflected light of the second laser beam reflected by the main surface, so as to acquire the height of the main surface along the cutting line.

3. A laser processing method for irradiating an object to be processed with a first laser beam while converging the first laser beam with a lens such that a converging point is positioned within the object, and forming a modified region within the object along a cutting line, the method comprising:

a height acquiring step of irradiating the object with a second laser beam for measuring height of a main surface of the object in an optical axis direction of the lens while converging the second laser beam with the lens, and acquiring the height of the main surface along the cutting line by detecting reflected light reflected by the main surface in response to the irradiation of the object by the second laser beam; and a processing step of emitting the first laser beam and moving the lens and the object relative to each other in a perpendicular direction to the optical axis direction of the lens while adjusting a distance between the lens and the main surface in the optical axis direction of the lens according to the acquired height, so as to form the modified region along the cutting line in a predetermined depth relative to the main surface of the object;

wherein the processing step comprises:

a processing preparatory step of setting a processing initial position for holding the lens with respect to the main surface according to the height of the main surface along the cutting line acquired by the height acquiring step so that the converging point is positioned at the predetermined depth under the main surface;

a first processing step of starting emitting the first laser beam while holding the lens at the processing initial position, and moving the lens and the object relative to each other in the perpendicular direction to the optical axis direction of the lens so as to form the modified region in one end part of the cutting line in the predetermined depth relative to the main surface of the object; and a second processing step of releasing the lens from the processing initial position after forming the modified region in the one end part of the cutting line, and moving the lens and the object relative to each other after said releasing while adjusting the distance between the lens and the main surface according to the height of the main surface along the cutting line acquired in the height acquiring step, so as to form the modified region.

4. A laser processing method according to any one of claims 1 to 3, wherein, in the height acquiring step, the first laser beam is emitted when acquiring the height of the main surface along the cutting line, so as to form the modified region along the cutting line.

5. A laser processing method according to claim 4, wherein the modified region formed in the height acquiring step is formed between the modified region formed in the processing step and the main surface.

6. A laser processing method according to any one of claims 1 to 3, wherein cutting the line includes first and second cutting lines;

wherein the height acquiring step moves the lens relative to the object in a first direction extending along the first cutting line, so as to acquire the height of the main surface along the first cutting line, and then moves the lens relative to the object in a second direction opposite from the first direction, so as to acquire the height of the main surface along the second cutting line; and wherein the processing step forms the modified region along the first cutting line in the first direction, and then forms the modified region along the second cutting line in the second direction.

7. A laser processing apparatus for irradiating an object to be processed with a first laser beam while converging the first laser beam with a lens such that a converging point is positioned within the object, and forming a modified region within the object along a cutting line, the apparatus comprising:

a lens for converging the first laser beam and a second laser beam toward the object for measuring height of a main surface of the object in an optical axis direction of the lens;

an optical measurement device for acquiring the height of the main surface of the object by detecting reflected light reflected by the main surface in response to irradiation of the object with the second laser beam;

a stage for moving the object and the lens relative to each other in a perpendicular direction to the optical axis direction of the lens;

an actuator for holding the lens such that the lens freely advances and retracts with respect to the main surface in the optical axis direction of the lens; and a control device for controlling respective behaviors of the stage and the actuator;

wherein, while the second laser beam is being emitted, the control device controls the stage so as to move the object and the lens relative to each other in the perpendicular direction to the optical axis direction of the lens, the optical measurement device acquiring the height of the main surface along the cutting line; and wherein, while the first laser beam is being emitted, the control device controls the actuator so as to hold the lens while adjusting a distance between the lens and the main surface in the optical axis direction of the lens according to the height acquired by the optical measurement device, and controls the stage so as to move the lens and the object relative to each other in the perpendicular direction to the optical axis direction of the lens, so that the modified region is formed in a predetermined depth relative to the main surface of the object;

wherein, while the second laser beam is being emitted, the control device controls the stage so as to move the object and the lens relative to each other in the perpendicular direction to the optical axis direction of the lens at a first speed; and wherein, while the first laser beam is being emitted, the control device controls the stage so as to move the lens and the object relative to each other in the perpendicular direction to the optical axis direction of the lens at a second speed faster than the first speed.

8. A laser processing apparatus for irradiating an object to be processed with a first laser beam while converging the first laser beam with a lens such that a converging point is positioned within the object, and forming a modified region within the object along a cutting line, the apparatus comprising:

a lens for converging the first laser beam and a second laser beam toward the object for measuring height of a main surface of the object in an optical axis direction of the lens;

an optical measurement device for acquiring height of the main surface of the object by detecting reflected light reflected by the main surface in response to irradiation of the object with the second laser beam;

a stage for moving the object and the lens relative to each other in a perpendicular direction to the optical axis direction of the lens;

an actuator for holding the lens such that the lens freely advances and retracts with respect to the main surface in the optical axis direction of the lens; and a control device for controlling respective behaviors of the stage and the actuator;

wherein, while the second laser beam is being emitted, the control device controls the stage so as to move the object and the lens relative to each other in the perpendicular direction to the optical axis direction of the lens, the optical measurement device acquiring the height of the main surface along the cutting line; and wherein, while the first laser beam is being emitted, the control device controls the actuator so as to hold the lens while adjusting a distance between the lens and the main surface in the optical axis direction of the lens according to the height acquired by the optical measurement device, and controls the stage so as to move the lens and the object relative to each other in the perpendicular direction to the optical axis direction of the lens, so that the modified region is formed in a predetermined depth relative to the main surface of the object;

wherein the control device controls the actuator so as to hold the lens at a measurement initial position set such that a converging point of the second laser beam is located at a predetermined position with respect to the object;

wherein, while starting the emission of the second laser beam with the lens being held at the measurement initial position, the control device controls the stage so as to move the lens and the object relative to each other in the perpendicular direction to the optical axis direction of the lens, and controls the actuator so as to release the lens from being held at the measurement initial position in response to the reflected light of the second laser beam reflected by the main surface; and wherein, after the release, the control device controls the actuator so as to adjust the distance between the lens and the main surface while detecting the reflected light of the second laser beam reflected by the main surface, the height acquiring optical measurement device acquiring the height of the main surface along the cutting line.

9. A laser processing apparatus for irradiating an object to be processed with a first laser beam while converging the first laser beam with a lens such that a converging point is positioned within the object, and forming a modified region within the object along a cutting line, the apparatus comprising:

a lens for converging the first laser beam and a second laser beam toward the object for measuring height of a main surface of the object in an optical axis direction of the lens;

an optical measurement device for acquiring height of the main surface of the object by detecting reflected light reflected by the main surface in response to irradiation of the object with the second laser beam;

a stage for moving the object and the lens relative to each other in a perpendicular direction to the optical axis direction of the lens;

an actuator for holding the lens such that the lens freely advances and retracts with respect to the main surface in the optical axis direction of the lens; and a control device for controlling respective behaviors of the stage and the actuator;

wherein, while the second laser beam is being emitted, the control device controls the stage so as to move the object and the lens relative to each other in the perpendicular direction to the optical axis direction of the lens, the optical measurement device acquiring the height of the main surface along the cutting line; and wherein, while the first laser beam is being emitted, the control device controls the actuator so as to hold the lens while adjusting a distance between the lens and the main surface in the optical axis direction of the lens according to the height acquired by the optical measurement device, and controls the stage so as to move the lens and the object relative to each other in the perpendicular direction to the optical axis direction of the lens so that the modified region is formed in a predetermined depth relative to the main surface of the object;

wherein the control device controls the actuator so as to set a processing initial position for holding the lens with respect to the main surface according to the height of the main surface along the cutting line acquired by the optical measurement device so that the converging point is positioned at the predetermined depth under the main surface;

wherein, while starting the emission of the first laser beam with the lens being held at the processing initial position, the control device controls the stage so as to move the lens and the object relative to each other in the perpendicular direction to the optical axis direction of the lens so as to form the modified region in one end part of the cutting line in the predetermined depth relative to the main surface of the object; and wherein, after forming the modified region in the one end part, the control device controls the actuator so as to release the lens from the processing initial position and to adjust the distance between the lens and the object according to the height of the main surface acquired by the optical measurement device, and controls the stage so as to move the lens and the object relative to each other in the perpendicular direction to the optical axis direction of the lens, thereby forming the modified region.

10. A laser processing apparatus according to any one of claims 7 to 9, wherein the optical measurement device emits the first laser beam when acquiring the height of the main surface, so as to form the modified region along the cutting line.

11. A laser processing apparatus according to claim 10, wherein the stage is adapted to move the object toward the lens; and wherein the control device controls the stage such that the modified region formed along the cutting line when the optical measurement device acquires the height is formed between the modified region formed later along the cutting line and the main surface.

12. A laser processing apparatus according to any one of claims 7 to 9, wherein the cutting line includes first and second cutting lines;

wherein the control device controls the stage so as to move the lens relative to the object in a first direction along the first cutting line, while the optical measurement device acquires the height of the main surface along the first cutting line, and then the control device controls the stage such that the lens moves relative to the object in a second direction opposite from the first direction, while the optical measurement device acquires the height of the main surface along the second cutting line; and wherein, after forming the modified region along the first cutting line in the first direction, the control device controls the stage so as to form the modified region along the second cutting line in the second direction.

13. A laser processing method according to claim 2, wherein the lens is held at the measurement initial position between a position corresponding to one end of the cutting line and a position corresponding to a position on the outside of the one end on an extension of the cutting line, and between a position corresponding to the other end of the cutting line and a position corresponding to a position on the outside of the other end on the extension of the cutting line.

14. A laser processing method according to claim 2, wherein the processing step comprises:

a processing preparatory step of setting a processing initial position for holding the lens with respect to the main surface according to the height of the main surface along the cutting line acquired by the height acquiring step, and holding the lens at thus set processing initial position;

a first processing step of starting emitting of the first laser beam while holding the lens at the processing initial position, and moving the lens and the object relative to each other in the perpendicular direction to the optical axis direction of the lens so as to form the modified region in the one end part of the cutting line; and a second processing step of releasing the lens from the processing initial position after forming the modified region in the one end part of the cutting line, and moving the lens and the object relative to each other in the perpendicular direction to the optical axis direction of the lens after the release while adjusting the distance between the lens and the main surface according to the height of the main surface along the cutting line acquired in the height acquiring step, so as to form the modified region in the predetermined depth relative to the main surface of the object.

15. A laser processing method according to claim 14, wherein the cutting line includes first and second cutting lines;

wherein the height acquiring step moves the lens relative to the object in a first direction extending along the first cutting line, so as to acquire the height of the main surface along the first cutting line, and then moves the lens relative to the object in a second direction opposite from the first direction, so as to acquire the height of the main surface along the second cutting line; and wherein the processing step forms the modified region along the first cutting line in the first direction, and then forms the modified region along the second cutting line in the second direction.

16. A laser processing method according to claim 2 or 3, wherein the cutting line includes first and second cutting lines;

wherein the height acquiring step moves the lens relative to the object in a first direction extending along the first cutting line, so as to acquire the height of the main surface along the first cutting line, and then moves the lens relative to the object in a second direction opposite from the first direction, so as to acquire the height of the main surface along the second cutting line; and wherein the processing step forms the modified region along the first cutting line in the first direction, and then forms the modified region along the second cutting line in the second direction.

17. A laser processing apparatus according to claim 8, wherein the lens is held at the measurement initial position between a position corresponding to one end of the cutting line and a position corresponding to a position on the outside of the one end on an extension of the cutting line, and between a position corresponding to the other end of the cutting line and a position corresponding to a position on the outside of the other end on the extension of the cutting line.

18. A laser processing apparatus according to claim 8, wherein the control device controls the actuator so as to set a processing initial position for holding the lens with respect to the main surface according to the height of the main surface along the cutting line acquired by the optical measurement device, and hold the lens at thus set processing initial position;

wherein, while starting the emission on the first laser beam with the lens being held at the processing initial position, the control device controls the stage so as to move the lens and the object relative to each other in the perpendicular direction to the optical axis direction of the lens, thereby forming the modified region in one end part of the cutting line; and wherein, after forming the modified region in the one end part, the control device controls the actuator so as to release the lens from the processing initial position and adjust the distance between the lens and the main surface of the object according to the height of the main surface acquired by the optical measurement device, and controls the stage so as to move the lens and object relative to each other in the perpendicular direction to the optical axis direction of the lens, thereby forming the modified region.

19. A laser processing apparatus according to claim 18, wherein the cutting line includes first and second cutting lines;
wherein the control device controls the stage so as to move the lens relative to the object in a first direction along the first cutting line, while the optical measurement device acquires the height of the main surface along the first cutting line, and then the control device controls the stage such that the lens moves relative to the object in a second direction opposite from the first direction, while the optical measurement device acquires the height of the main surface along the second cutting line; and
wherein, after forming the modified region along the first cutting line in the first direction, the control device controls the stage so as to form the modified region along the second cutting line in the second direction.

20. A laser processing apparatus according to claim 8 or 9, wherein the cutting line includes first and second cutting lines;
wherein the control device controls the stage so as to move the lens relative to the object in a first direction along the first cutting line, while the optical measurement device acquires the height of the main surface along the first cutting line, and then control device controls the stage such that the lens moves relative to the object in a second direction opposite from the first direction, while the optical measurement device acquires the height of the main surface along the second cutting line; and
wherein, after forming the modified region along the first cutting line in the first direction, the control device controls the stage so as to form the modified region along the second cutting line in the second direction.

21. A laser processing method according to claim 1, wherein the height acquiring step comprises:
a measurement preparatory step of holding the lens at a measurement initial position set such that a converging point of the second laser beam is located at a predetermined position with respect to the object;
a first measurement step of starting emitting the second laser beam while holding the lens at the measurement initial position, moving the lens and the object relative to each other in the perpendicular direction to the optical axis direction of the lens, and releasing the lens from the measurement initial position in response to reflected light of the second laser beam reflected by the main surface; and
a second measurement step of adjusting the distance between the lens and the main surface after the release while detecting the reflected light of the second laser beam reflected by the main surface, so as to acquire the height of the main surface along the cutting line.

22. A laser processing method according to claim 21, wherein the processing step comprises:
a processing preparatory step of setting a processing initial position for holding the lens with respect to the main surface according to the height of the main surface along the cutting line acquired by the height acquiring step, and holding the lens at thus set processing initial position;
a first processing step of starting emitting the first laser beam while holding the lens at the processing initial position, and moving the lens and the object relative to each other in the perpendicular direction to the optical axis direction of the lens so as to form the modified region in one end part of the cutting line; and
a second processing step of releasing the lens from the processing initial position after forming the modified region in the one end part of the cutting line, and moving the lens and the object relative to each other in the perpendicular direction to the optical axis direction of the lens after the release while adjusting the distance between the lens and the main surface according to the height of the main surface along the cutting line acquired in the height acquiring step, so as to form the modified region.

23. A laser processing apparatus according to claim 7, wherein the control device controls the actuator so as to hold the lens at a measurement initial position set such that a converging point of the second laser beam is located at a predetermined position with respect to the object;
wherein, while starting the emission of the second laser beam with the lens being held at the measurement initial position, the control device controls the stage so as to move the lens and the object relative to each other in the perpendicular direction to the optical axis direction of the lens, and controls the actuator so as to release the lens from the measurement initial position in response to the reflected light of the second laser beam reflected by the main surface; and
wherein, after the release, the control device controls the actuator so as to adjust the distance between the lens and the main surface while detecting the reflected light of the second laser beam reflected by the main surface, the optical measurement device acquiring the height of the main surface along the cutting line.

24. A laser processing apparatus according to claim 23, wherein the control device controls the actuator so as to set a processing initial position for holding the lens with respect to the main surface according to the height of the main surface along the cutting line acquired by the optical measurement device, and hold the lens at thus set processing initial position;
wherein, while starting the emission of the first laser beam with the lens being held at the processing initial position, the control device controls the stage so as to move the lens and the object relative to each other in the perpendicular direction to the optical axis direction of the lens, thereby forming the modified region in one end part of the cutting line; and
wherein, after forming the modified region in the one end part, the control device controls the actuator so as to release the lens from the processing initial position and adjust the distance between the lens and the object according to the height of the main surface acquired by the optical measurement device, and controls the stage so as to move the lens and the object relative to each other, thereby forming the modified region.

* * * * *